(12) United States Patent
Cochran et al.

(10) Patent No.: US 6,907,505 B2
(45) Date of Patent: Jun. 14, 2005

(54) IMMEDIATELY AVAILABLE, STATICALLY ALLOCATED, FULL-LOGICAL-UNIT COPY WITH A TRANSIENT, SNAPSHOT-COPY-LIKE INTERMEDIATE STAGE

(75) Inventors: Robert A. Cochran, Rocklin, CA (US); Titus E. Davis, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 105 days.

(21) Appl. No.: 10/209,822

(22) Filed: Jul. 31, 2002

(65) Prior Publication Data
US 2004/0024961 A1 Feb. 5, 2004

(51) Int. Cl.[7] .............................................. G06F 12/00
(52) U.S. Cl. ........................... 711/162; 711/4; 711/111; 711/112; 711/161; 711/210; 711/213; 707/201; 707/202; 707/203; 707/205
(58) Field of Search .............................. 711/4, 111–112, 711/114, 161–162, 210, 213; 707/201–205

(56) References Cited

U.S. PATENT DOCUMENTS 6,594,745 B2 * 7/2003 Grover ....................... 711/162
6,618,794 B1 * 9/2003 Sicola et al. ................ 711/154
6,721,902 B1 * 4/2004 Cochran ........................ 714/6
2003/0188035 A1 * 10/2003 Lubbers et al. ............. 709/310
2003/0188218 A1 * 10/2003 Lubbers et al. ................ 714/5

OTHER PUBLICATIONS

Cabrera et al., Mar. 5–9, 1995, IEEE, pp. 420–427.*

* cited by examiner

Primary Examiner—Donald Sparks
Assistant Examiner—Hashem Farrokh

(57) ABSTRACT

A hybrid LUN copy operation that ultimately produces a full LUN copy, but involves a transient snapshot-copy-like intermediate stage. In one embodiment, a statically pre-allocated copy LUN is initialized with references pointing back to the primary LUN. Over time, the sectors, blocks, or other data-storage units of the primary LUN are copied to the copy LUN, so that, in the end, a full copy LUN in completed. In a second, alternative embodiment, both the primary LUN and copy LUN are READ and WRITE accessible immediately following the nearly instantaneous initialization of the copy LUN. In both embodiments, the copy LUN may be statically allocated. The immediate-full-LUN-copy operations provided by the present invention further enable rotatable copy-LUN groups, each copy LUN within a copy-LUN group representing a full, robust copy LUN.

15 Claims, 23 Drawing Sheets

IMMEDIATELY AVAILABLE, STATICALLY ALLOCATED, FULL-LOGICAL-UNIT COPY WITH A TRANSIENT, SNAPSHOT-COPY-LIKE INTERMEDIATE STAGE

TECHNICAL FIELD

The present invention relates to copying, or replicating, logical units in multiple-logical-unit mass storage devices, including disk arrays, and, in particular, to a method and system for creating an instantaneously available, full copy of a logical unit employing a transient snapshot-copy-like intermediate stage.

BACKGROUND OF THE INVENTION

The present invention is related to copying logical units within mass-storage devices that provide multiple logical units, such as disk arrays. An embodiment of the present invention, discussed below, involves disk-array mass-storage devices. To facilitate that discussion, a general description of disk drives and disk arrays is first provided.

The most commonly used non-volatile mass-storage device in the computer industry is the magnetic disk drive. In the magnetic disk drive, data is stored in tiny magnetized regions within an iron-oxide coating on the surface of the disk platter. A modem disk drive comprises a number of platters horizontally stacked within an enclosure. The data within a disk drive is hierarchically organized within various logical units of data. The surface of a disk platter is logically divided into tiny, annular tracks nested one within another. FIG. 1A illustrated tracks on the surface of a disk platter. Note that, although only a few tracks are shown in FIG. 1A, such as track 101, an actual disk platter may contain many thousands of tracks. Each track is divided into radial sectors. FIG. 1B illustrates sectors within a single track on the surface of the disk platter. Again, a given disk track on an actual magnetic disk platter may contain many tens or hundreds of sectors. Each sector generally contains a fixed number of bytes. The number of bytes within a sector is generally operating-system dependent, and normally ranges from 512 bytes per sector to 4096 bytes per sector. The data normally retrieved from, and stored to, a hard disk drive is in units of sectors.

The modern disk drive generally contains a number of magnetic disk platters aligned in parallel along a spindle passed through the center of each platter. FIG. 2 illustrates a number of stacked disk platters aligned within a modem magnetic disk drive. In general, both surfaces of each platter are employed for data storage. The magnetic disk drive generally contains a comb-like array with mechanical READ/WRITE heads 201 that can be moved along a radial line from the outer edge of the disk platters toward the spindle of the disk platters. Each discrete position along the radial line defines a set of tracks on both surfaces of each disk platter. The set of tracks within which ganged READ/WRITE heads are positioned at some point along the radial line is referred to as a cylinder. In FIG. 2, the tracks 202–210 beneath the READ/WRITE heads together comprise a cylinder, which is graphically represented in FIG. 2 by the dashed-out lines of a cylinder 212.

FIG. 3 is a block diagram of a standard disk drive. The disk drive 301 receives input/output ("I/O") requests from remote computers via a communications medium 302 such as a computer bus, fibre channel, or other such electronic communications medium. For many types of storage devices, including the disk drive 301 illustrated in FIG. 3, the vast majority of I/O requests are either READ or WRITE requests. A READ request requests that the storage device return to the requesting remote computer some requested amount of electronic data stored within the storage device. A WRITE request requests that the storage device store electronic data furnished by the remote computer within the storage device. Thus, as a result of a READ operation carried out by the storage device, data is returned via communications medium 302 to a remote computer, and as a result of a WRITE operation, data is received from a remote computer by the storage device via communications medium 302 and stored within the storage device.

The disk drive storage device illustrated in FIG. 3 includes controller hardware and logic 303 including electronic memory, one or more processors or processing circuits, and controller firmware, and also includes a number of disk platters 304 coated with a magnetic medium for storing electronic data. The disk drive contains many other components not shown in FIG. 3, including READ/WRITE heads, a high-speed electronic motor, a drive shaft, and other electronic, mechanical, and electromechanical components. The memory within the disk drive includes a request/reply buffer 305, which stores I/O requests received from remote computers, and an I/O queue 306 that stores internal I/O commands corresponding to the I/O requests stored within the request/reply buffer 305. Communication between remote computers and the disk drive, translation of I/O requests into internal I/O commands, and management of the I/O queue, among other things, are carried out by the disk drive I/O controller as specified by disk drive I/O controller firmware 307. Translation of internal I/O commands into electromechanical disk operations in which data is stored onto, or retrieved from, the disk platters 304 is carried out by the disk drive I/O controller as specified by disk media read/write management firmware 308. Thus, the disk drive I/O control firmware 307 and the disk media read/write management firmware 308, along with the processors and memory that enable execution of the firmware, compose the disk drive controller.

Individual disk drives, such as the disk drive illustrated in FIG. 3, are normally connected to, and used by, a single remote computer, although it has been common to provide dual-ported disk drives for concurrent use by two computers and multi-host-accessible disk drives that can be accessed by numerous remote computers via a communications medium such as a fibre channel. However, the amount of electronic data that can be stored in a single disk drive is limited. In order to provide much larger-capacity electronic data-storage devices that can be efficiently accessed by numerous remote computers, disk manufacturers commonly combine many different individual disk drives, such as the disk drive illustrated in FIG. 3, into a disk array device, increasing both the storage capacity as well as increasing the capacity for parallel I/O request servicing by concurrent operation of the multiple disk drives contained within the disk array.

FIG. 4 is a simple block diagram of a disk array. The disk array 402 includes a number of disk drive devices 403, 404, and 405. In FIG. 4, for simplicity of illustration, only three individual disk drives are shown within the disk array, but disk arrays may contain many tens or hundreds of individual disk drives. A disk array contains a disk array controller 406 and cache memory 407. Generally, data retrieved from disk drives in response to READ requests may be stored within the cache memory 407 so that subsequent requests for the same data can be more quickly satisfied by reading the data from the quickly accessible cache memory rather than from the much slower electromechanical disk drives. Various elaborate mechanisms are employed to maintain, within the cache memory 407, data that has the greatest chance of being subsequently re-requested within a reasonable amount of time. The disk saves recent WRITE requests, in cache memory 407, in the event that the data may be subsequently requested via READ requests or in order to defer slower writing of the data to physical storage medium.

Electronic data is stored within a disk array at specific addressable locations. Because a disk array may contain many different individual disk drives, the address space represented by a disk array is immense, generally many thousands of gigabytes. The overall address space is normally partitioned among a number of abstract data storage resources called logical units ("LUNs"). A LUN includes a defined amount of electronic data storage space, mapped to the data storage space of one or more disk drives within the disk array, and may be associated with various logical parameters including access privileges, backup frequencies, and mirror coordination with one or more LUNs. LUNs may also be based on random access memory ("RAM"), mass-storage devices other than hard disks, or combinations of memory, hard disks, and/or other types of mass-storage devices. Remote computers generally access data within a disk array through one of the many abstract LUNs 408–415 provided by the disk array via internal disk drives 403–405 and the disk array controller 406. Thus, a remote computer may specify a particular unit quantity of data, such as a byte, word, or block, using a bus communications media address corresponding to a disk array, a LUN specifier, normally a 64-bit integer, and a 32-bit, 64-bit, or 128-bit data address that specifies a LUN, and a data address within the logical data address partition allocated to the LUN. The disk array controller translates such a data specification into an indication of a particular disk drive within the disk array and a logical data address within the disk drive. A disk drive controller within the disk drive finally translates the logical address to a physical medium address. Normally, electronic data is read and written as one or more blocks of contiguous 32-bit or 64-bit computer words, the exact details of the granularity of access depending on the hardware and firmware capabilities within the disk array and individual disk drives as well as the operating system of the remote computers generating I/O requests and characteristics of the communication medium interconnecting the disk array with the remote computers.

In many computer applications and systems that need to reliably store and retrieve data from a mass-storage device, such as a disk array, a primary data object, such as a file or database, is normally backed up to backup copies of the primary data object on physically discrete mass-storage devices or media so that if, during operation of the application or system, the primary data object becomes corrupted, inaccessible, or is overwritten or deleted, the primary data object can be restored by copying a backup copy of the primary data object from the mass-storage device. Many different techniques and methodologies for maintaining backup copies have been developed. In one well-known technique, a primary data object is mirrored. FIG. 5 illustrates object-level mirroring. In FIG. 5, a primary data object "$O_3$" 501 is stored on LUN A 502. The mirror object, or backup copy, "$O_3$" 503 is stored on LUN B 504. The arrows in FIG. 5, such as arrow 505, indicate I/O write operations directed to various objects stored on a LUN. I/O write operations directed to object "$O_3$" are represented by arrow 506. When object-level mirroring is enabled, the disk array controller providing LUNs A and B automatically generates a second I/O write operation from each I/O write operation 506 directed to LUN A, and directs the second generated I/O write operation via path 507, switch "$S_1$" 508, and path 509 to the mirror object "$O_3$" 503 stored on LUN B 504. In FIG. 5, enablement of mirroring is logically represented by switch "$S_1$" 508 being on. Thus, when object-level mirroring is enabled, any I/O write operation, or any other type of I/O operation that changes the representation of object "$O_3$" 501 on LUN A, is automatically mirrored by the disk array controller to identically change the mirror object "$O_3$" 503. Mirroring can be disabled, represented in FIG. 5 by switch "$S_1$" 508 being in an off position. In that case, changes to the primary data object "$O_3$" 501 are no longer automatically reflected in the mirror object "$O_3$" 503. Thus, at the point that mirroring is disabled, the stored representation, or state, of the primary data object "$O_3$" 501 may diverge from the stored representation, or state, of the mirror object "$O_3$" 503. Once the primary and mirror copies of an object have diverged, the two copies can be brought back to identical representations, or states, by a resync operation represented in FIG. 5 by switch "$S_2$" 510 being in an on position. In the normal mirroring operation, switch "$S_2$" 510 is in the off position. During the resync operation, any I/O operations that occurred after mirroring was disabled are logically issued by the disk array controller to the mirror copy of the object via path 511, switch "$S_2$," and pass 509. During resync, switch "$S_1$" is in the off position. Once the resync operation is complete, logical switch "$S_2$" is disabled and logical switch "$S_1$" 508 can be turned on in order to reenable mirroring so that subsequent I/O write operations or other I/O operations that change the storage state of primary data object "$O_3$," are automatically reflected to the mirror object "$O_3$" 503.

FIG. 6 illustrates a dominant LUN coupled to a remote-mirror LUN. In FIG. 6, a number of computers and computer servers 601–608 are interconnected by various communications media 610–612 that are themselves interconnected by additional communications media 613–614. In order to provide fault tolerance and high availability for a large data set stored within a dominant LUN on a disk array 616 coupled to server computer 604, the dominant LUN 616 is mirrored to a remote-mirror LUN provided by a remote disk array 618. The two disk arrays are separately interconnected by a dedicated communications medium 620. Note that the disk arrays may be linked to server computers, as with disk arrays 616 and 618, or may be directly linked to communications medium 610. The dominant LUN 616 is the target for READ, WRITE, and other disk requests. All WRITE requests directed to the dominant LUN 616 are transmitted by the dominant LUN 616 to the remote-mirror LUN 618, so that the remote-mirror LUN faithfully mirrors the data stored within the dominant LUN. If the dominant LUN fails, the requests that would have been directed to the dominant LUN can be redirected to the mirror LUN without a perceptible interruption in request servicing. When operation of the dominant LUN 616 is restored, the dominant LUN 616 may become the remote-mirror LUN for the previous remote-mirror LUN 618, which becomes the new dominant LUN, and may be resynchronized to become a faithful copy of the new dominant LUN 618. Alternatively, the restored dominant LUN 616 may be brought up to the same data state as the remote-mirror LUN 618 via data copies from the remote-mirror LUN and then resume operating as the dominant LUN. Various types of dominant-LUN/remote-mirror-LUN pairs have been devised. Some operate entirely synchronously, while others allow for asynchronous operation and reasonably slight discrepancies between the data states of the dominant LUN and mirror LUN.

In certain cases, LUN mirroring is launched immediately after configuring the LUNs, so that, from the very first unit of data written to a mirror pair, each LUN of the mirror pair is identically updated. In such cases, LUN copying, or replication, is generally not needed. In other cases, a non-mirrored primary LUN is first replicated, to create a copy LUN, and then the primary LUN and copy LUN are paired together as a mirror pair, which can be later split for independent access and updating. In still other cases, rather than using mirror LUNs, a system achieves reliability by periodically creating full, or snapshot, copies of a primary LUN to serve as consistent, backup copy LUNs that can be used to restore the primary LUN in case that the physical-storage devices containing the primary LUN fail or become inaccessible. LUN replication is thus a fundamental operation in many, and perhaps most, high-availability and disaster-recovery-capable mass-storage-device systems.

In general, mass-storage devices, such as disk arrays, support two basic types of LUN replication: (1) full copy; and (2) snapshot copy. A full copy involves faithfully copying each sector within a primary LUN to a copy LUN. In general, the copy LUN is statically allocated in advance of the replication operation. While the replication operation is underway, the primary, LUN continues to provide READ and WRITE access, while the copy LUN remains in a READ-only state until the replication operation is complete. For large LUNs, the replication operation may take considerable amounts of time, and create considerable, although temporary, performance bottlenecks within a mass-storage device such as a disk array.

A snapshot copy, by contrast, can be essentially immediately created. In a snapshot copy, a cache-resident meta-data map indicates whether a particular unit of data, such as a sector or block, of the copy LUN is resident in the primary LUN or in a delta-data LUN used to store data written to the copy LUN following a split of the primary-LUN/copy-LUN pair. Initially, the copy LUN is identical to the primary LUN, and so each reference within the meta-data map points to a sector, or block, of data within the primary LUN. After the primary LUN is split from the copy LUN, data written to the copy LUN begins to fill the delta-data LUN, and corresponding meta-data references point to blocks, or sectors, within the delta-data LUN. The snapshot copy is thus a virtual copy of the primary LUN implemented as a combination of the primary LUN, the meta-data map, and the delta-data LUN. Unlike a full copy, a snapshot copy cannot be used to restore a failed primary LUN following a primary-LUN catastrophe. However, snapshot copies need allocation of less internal resources than full copies, and can be used for creating virtual copies to offload accesses from the primary LUN for purposes such as backing-up the snapshot data to a secondary mass-storage device.

As the demands on mass-storage, such as disk arrays, increase, and with increasing demands on high-availability and fault-tolerant systems, the shortcomings of full copies and snapshot copies have become less tolerable to high-availability and fault-tolerant systems designers, manufacturers, and users. For disaster-recovery-capable and high-availability systems, snapshot copies cannot be used for robust backups because much of the data virtually associated with a snapshot-copy LUN actually remains stored on the primary LUN. Thus, the primary LUN remains a single point of failure. However, the significant overhead in time and resource utilization attendant with a full LUN copy may seriously impact the performance of a high-availability system. For these, and additional reasons to be discussed below, designers, manufacturers, and users of mass-storage devices, and of high-availability and fault-tolerant systems build around them, have recognized the need for a more efficient LUN copy operation that provides the robustness of a full LUN copy.

SUMMARY OF THE INVENTION

In one embodiment of the present invention, a hybrid LUN copy operation that ultimately produces a full LUN copy, but involves a transient snapshot-copy-like intermediate stage, is provided as an alternative to the currently available full-LUN-copy operation supported by common mass-storage devices, such as disk arrays. In one embodiment, a statically pre-allocated copy LUN is initialized with references pointing back to the primary LUN. In other words, each sector, block, or other convenient data-storage unit is initialized to indicate indirection and to contain a pointer referencing the corresponding data-containing data-storage unit within the primary LUN. Over time, the data-storage units of the primary LUN are copied to the copy LUN, so that, in the end, a complete copy LUN is obtained. The initial, reference-containing copy LUN, or virtual LUN, can be created nearly instantaneously in the cache memory of the mass-storage device containing the virtual LUN. In the first embodiment, the copy LUN provides READ-only access until copying of data from the primary LUN to the copy LUN is completed. In a second, alternative embodiment, both the primary LUN and copy LUN are READ-and-WRITE accessible immediately following the nearly instantaneous initialization of the copy LUN. In both embodiments, the copy LUN may be statically allocated. The immediate-full-LUN-copy operation provided by the present invention further enables rotatable LUN-copy groups, each copy LUN copy within a copy-LUN group representing a full, robust LUN copy.

DETAILED DESCRIPTION OF THE INVENTION

Two embodiments of the present invention, discussed below, involve new types of LUN-copy operations that provide an essentially instantaneous copy, similar to a snapshot-copy, which subsequently matures to a full, robust copy LUN. These embodiments are discussed, below, with reference to a series of figures that depict logical LUN-copy operations. It should be noted that the logical, sequential data-storage units within a LUN may be mapped to, and distributed over, both cache memory and a number of physical data-storage devices within a mass-storage device, such as a disk array. It is beyond the scope of the discussion of the present invention to delve into details of LUN-to-physical-device mappings. The control logic, firmware, and software programs within a mass-storage device may be modularly organized to interface to modules that exchange logical data-storage-unit addresses, so that implementation of the present invention may be carried from the logical-storage level. It should be noted that the immediate, full-LUN-copy operations provided by the present invention may be extended to operations for copying data at alternative levels of abstraction, including volumes, volume groups, files, and other such abstractions.

Figure 7:
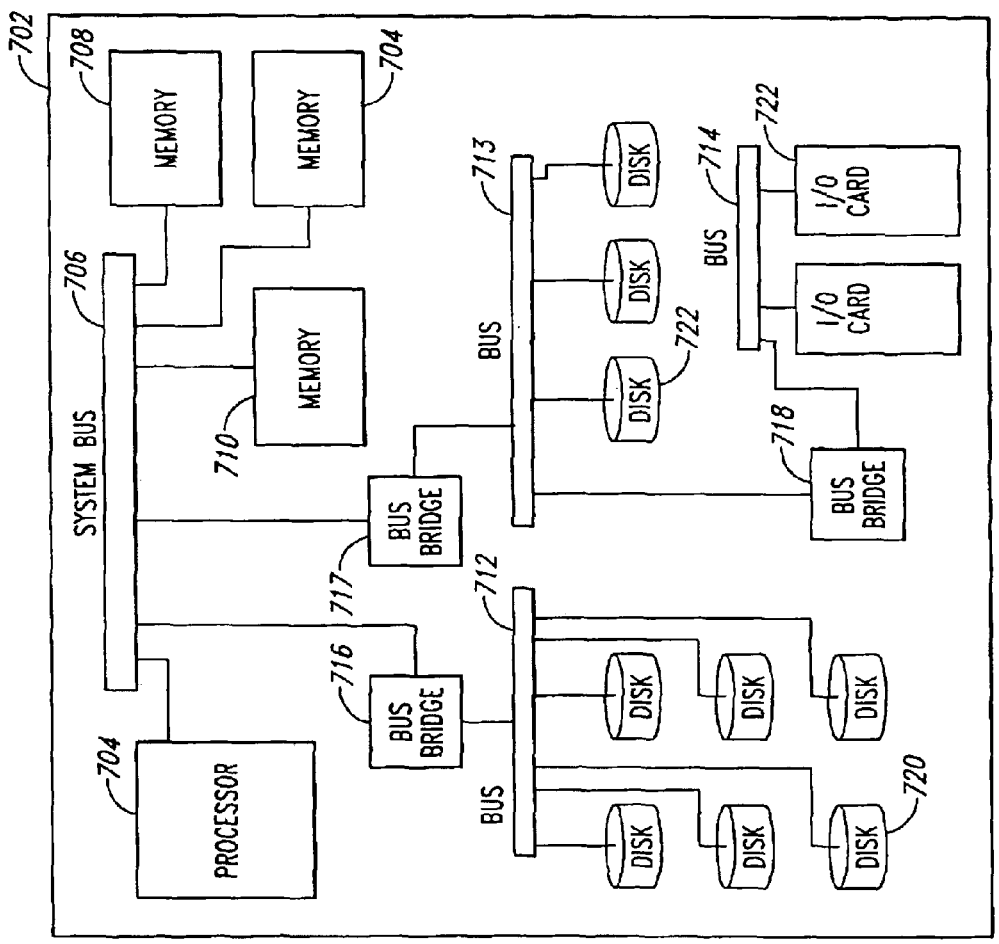
FIG. 7 is a simplified block diagram of an exemplary mass-storage device, such as a disk array.

A fundamental concept involving physical components of a mass-storage device is resource contention, including physical-storage-device, data-path, and processing-component contention within a mass-storage device. FIG. 7 is a simplified block diagram of an exemplary mass-storage device, such as a disk array. The mass-storage device 702 shown in FIG. 7 includes a processor 704, a system bus 706 that interconnects various memory components 708–710 to the processor 704, three input/output ("I/O") buses 712–714 interconnected with one another and with the system bus 706 by three bus bridges 716–718, and peripheral devices including disk drives, such as disk drive 720, and I/O cards, such as I/O card 722, interconnected with the processor 704 and memory components 708–710 via the I/O buses and bus bridges. If a primary-LUN/copy-LUN pair is intended for concurrent access, either before or after a split operation, then the physical mapping of the primary LUN and copy LUN to data-storage components of a mass-storage device may be a critical determinant of the overall performance of the mass-storage device, particularly with respect to READ and WRITE accesses directed to the primary and copy LUNs. For example, considering the exemplary mass-storage device in FIG. 7, if both the primary and copy LUNS are physically mapped to a single disk-drive, such as disk drive 720, then concurrent access to both the primary LUN and copy LUN may produce bottlenecks within the disk drive 720, within I/O bus 712, or within the bus bridge 716. If any of the disk drive 720, I/O bus 712, or bus bridge 716 represents a rate-limiting component for all of or a portion of the concurrent access to the primary LUN and copy LUN, then a performance bottleneck may ensue, limiting the overall performance of the mass-storage device, particularly with respect to the primary and copy LUNS. By contrast, if the primary LUN is mapped to disk drive 720, and the copy LUN is mapped to disk drive 722, then access to the primary LUN stored on disk drive 720 involves a different physical disk drive, I/O bus, and bus bridge than access to the copy LUN, stored on disk drive 722. In other words, accesses to the primary LUN and copy LUN are distributed over multiple disk drives, including disk controllers, I/O buses, and bus bridges, potentially removing performance bottlenecks that might otherwise result when accesses to the primary and copy LUNs involve a single bus bridge, I/O bus, or disk drive. Far more complex strategies may be employed to ameliorate resource contention, including distributing and interleaving LUNs over many different physical storage devices to take advantage of predictable patterns of accesses, various mechanical and electrical latencies of physical components, and other such considerations. For this reason, it is often quite desirable to particularly specify the physical mappings of primary and copy LUNs within a mass-storage device, at least to the level of the physical data-storage devices on which data for the primary and copy LUNs is stored.

In general, a LUN may be either statically or dynamically allocated within a mass-storage device. Static allocation involves pre-allocating physical storage for the LUN, often during configuration of the mass-storage device, or as a separate allocation operation. By contrast, dynamic allocation of a LUN involves finding suitable and adequate space within one or more physical data-storage devices of the mass-storage device at run-time. When a LUN is statically allocated, a user or system manager may precisely map the LUN to physical data-storage devices. However, when a LUN is dynamically allocated, the locations of available physical storage are quite dependent on run-time history of a mass-storage device following configuration and booting and, in general, a user or administrator cannot precisely specify the mapping of a dynamically allocated LUN to physical data-storage components within a mass-storage device.

Currently, full-LUN-copy operations, supported by current mass-storage devices, involve statically allocating the copy LUN prior to initiating the full-LUN-copy operation. Thus, a full-LUN-copy allows a user or system administrator to analyze the mass-storage device in order to place the primary LUN and copy LUN on physical devices in a way to minimize contention for resources within the mass-storage device. By contrast, current snapshot-LUN-copy operations on currently available mass-storage devices involve dynamic allocation of the delta-data LUN and meta-data map, discussed above. Thus, snapshot-LUN-copy operations currently do not allow a user or system administrator to place the primary LUN and snapshot-copy-LUN-related entities on physical-storage devices in order to minimize resource contention.

Figure 1A:
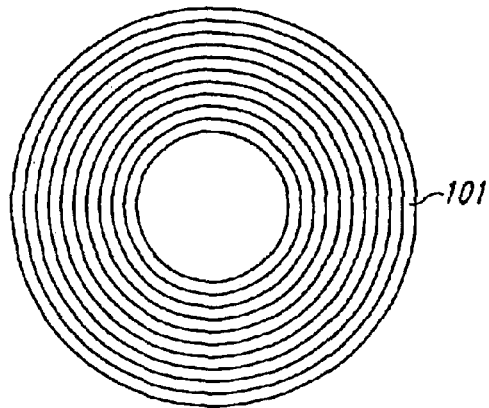
FIG. 1A illustrated tracks on the surface of a disk platter.
Figure 1B:
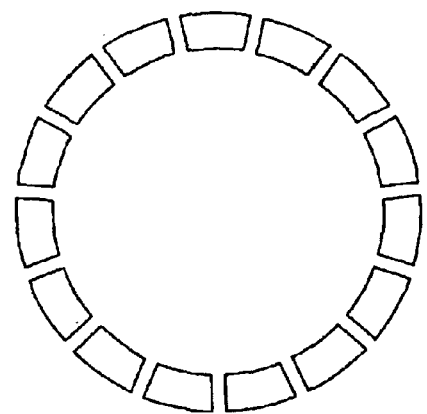
FIG. 1B illustrates sectors within a single track on the surface of the disk platter.
Figure 2:
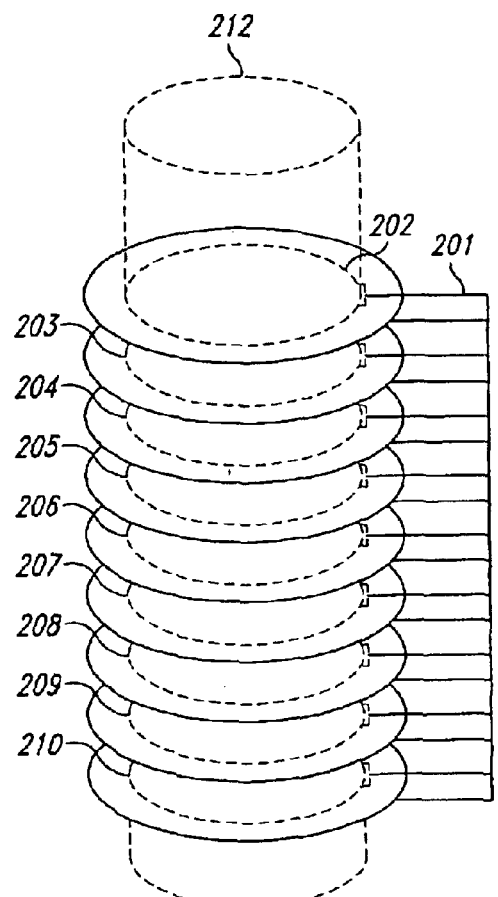
FIG. 2 illustrates a number of disk platters aligned within a modern magnetic disk drive.
Figure 3:
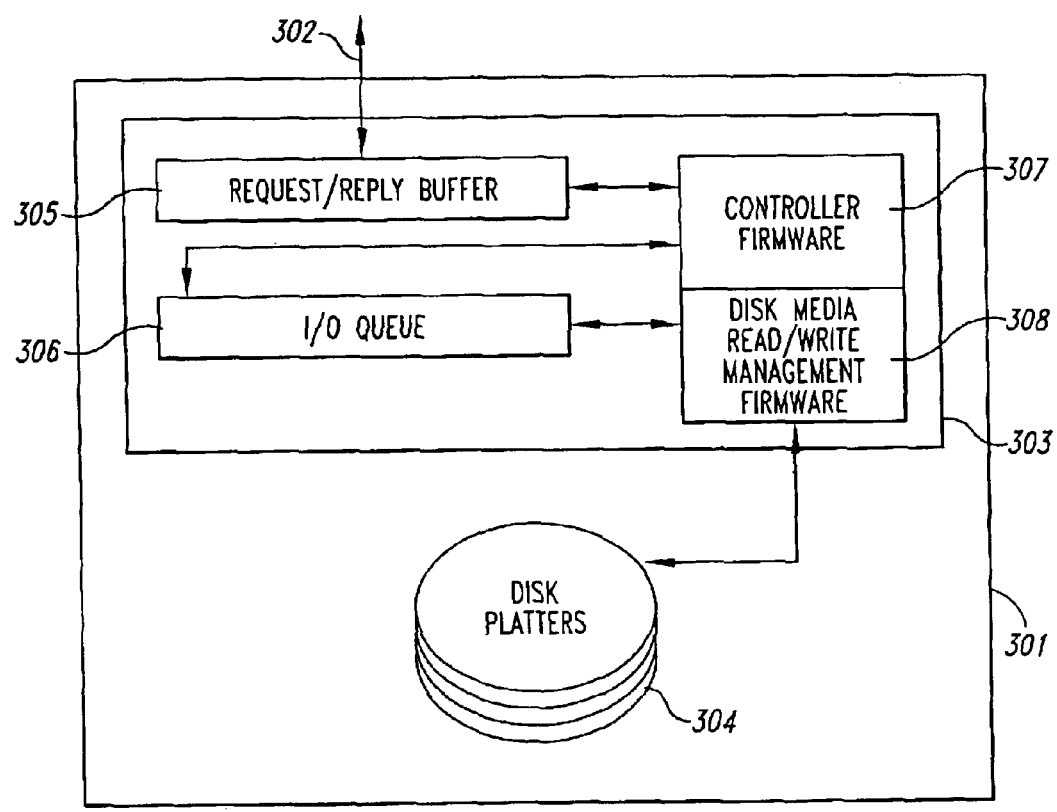
FIG. 3 is a block diagram of a standard disk drive.
Figure 4:
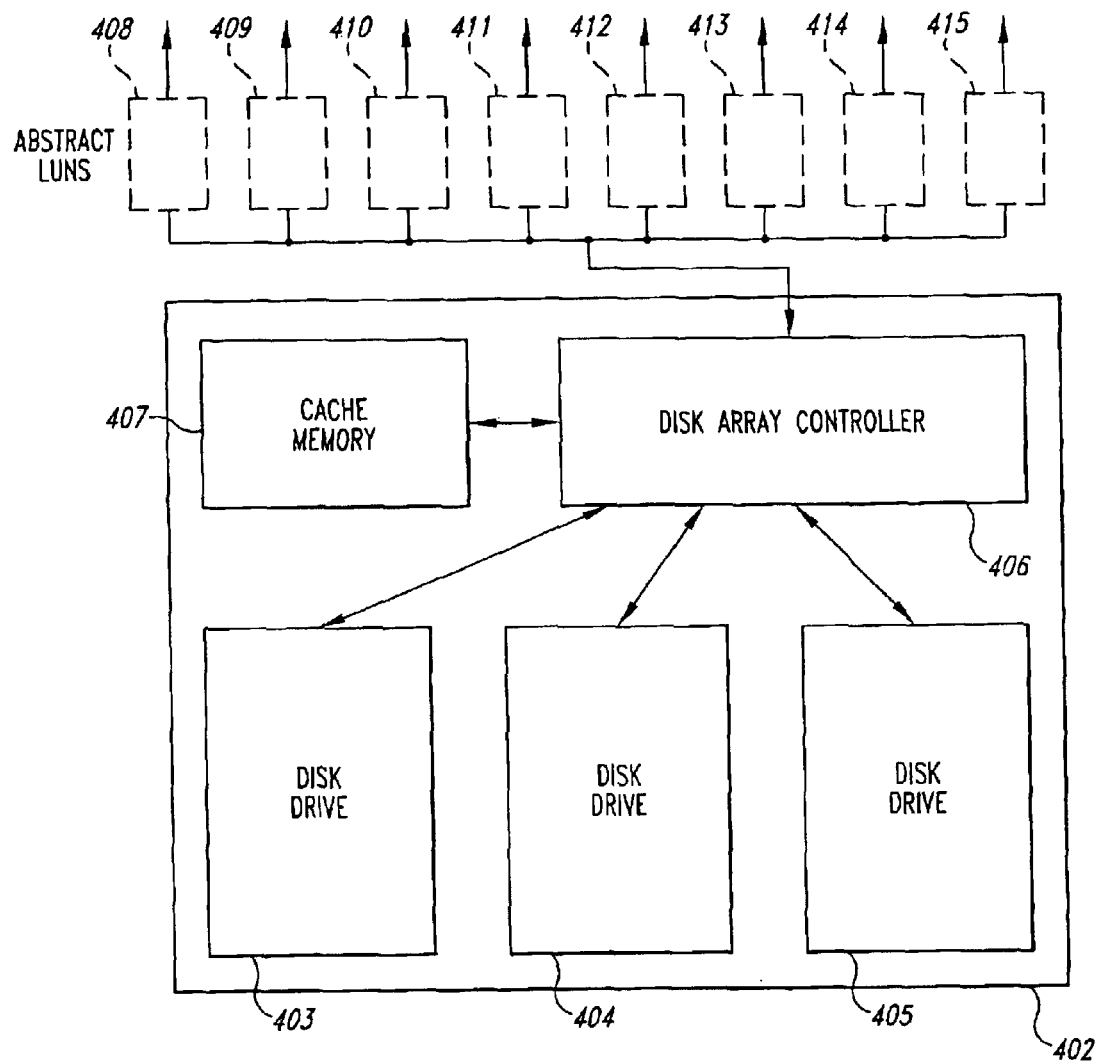
FIG. 4 is a simple block diagram of a disk array.
Figure 5:
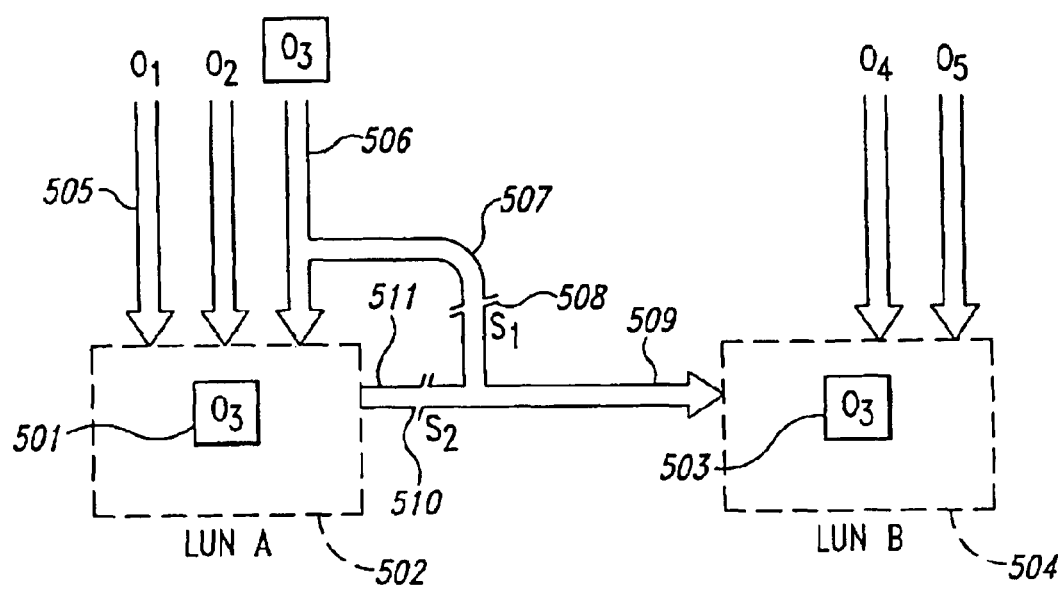
FIG. 5 illustrates object-level mirroring.
Figure 6:
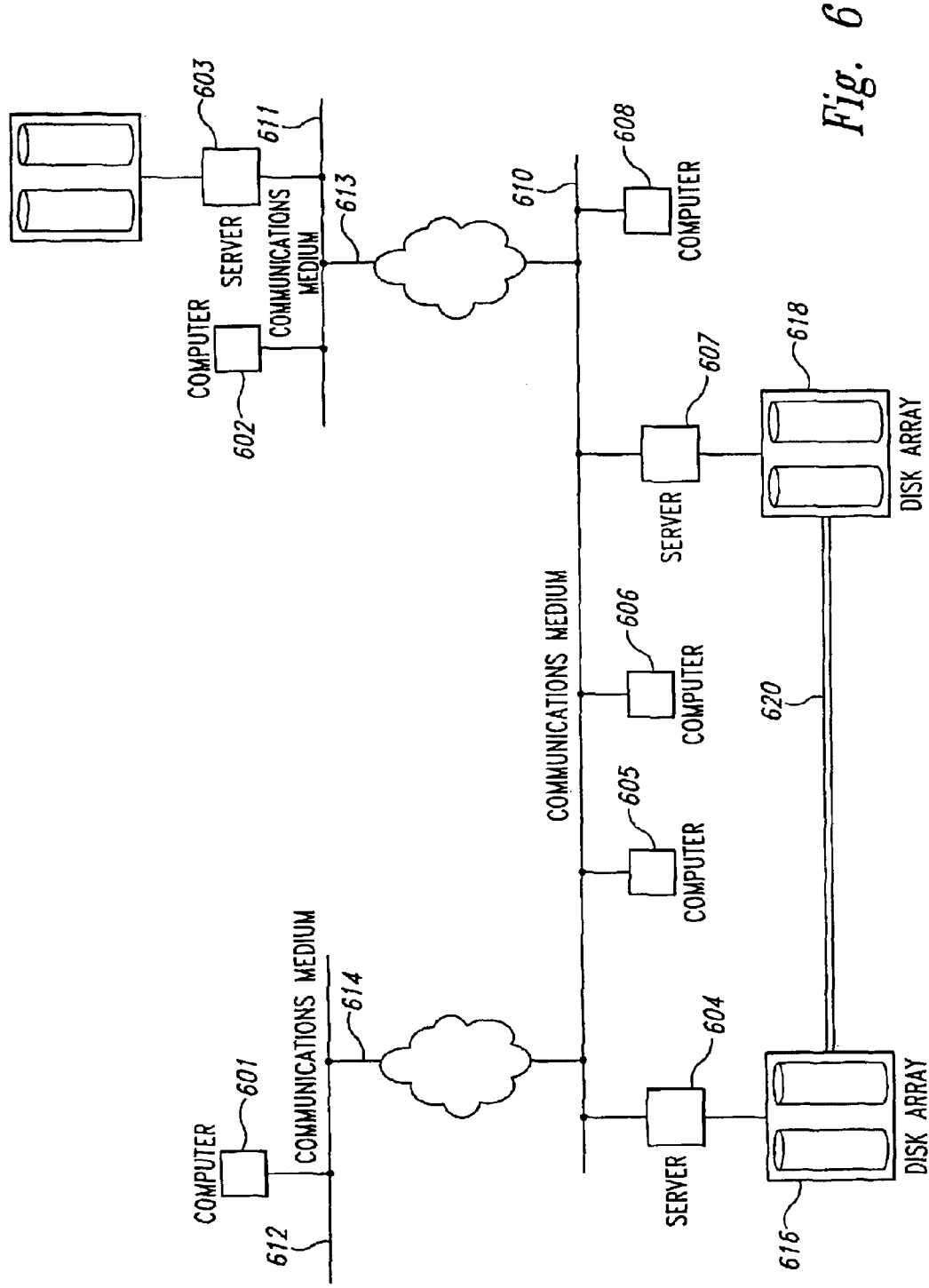
FIG. 6 illustrates a dominant LUN coupled to a remote-mirror LUN.
Figure 8:
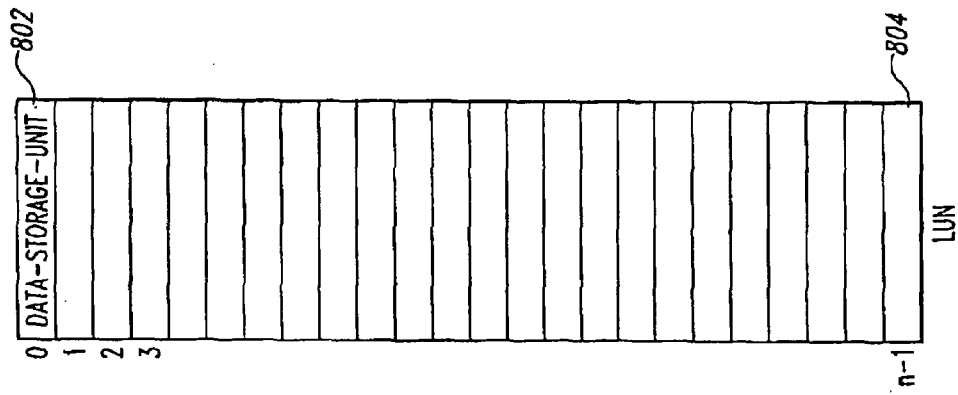
FIG. 8 shows a representation of a LUN.

In the following discussion, the currently available full-LUN-copy operation and snapshot-LUN-copy operation, as well as two new LUN-copy operations provided by the present invention, are described with reference to simple, abstract representations of LUNs. An example simple, abstract representation of a LUN is shown in FIG. 8. In FIG. 8, the LUN is represented as a sequence of accessible data-storage units, such as blocks, sectors, or other convenient data-storage units that are addressable and accessible in a single, data-storage-device-access operation. The LUN begins with a first sector, block, or other data-storage unit 802, having index, or address, 0, and ends with a final data-storage unit 804 with address n−1. As discussed above, a LUN may be mapped to one or more physical data-storage devices, and may be physically stored in a number of discrete, non-contiguous data-storage regions within the one or more physical data-storage devices.

Figure 9A:
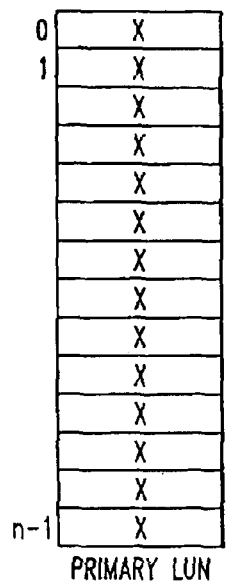
FIGS. 9A–J illustrate the currently available, snapshot-LUN-copy operation within mass-storage devices, such as disk arrays.
Figure 9B:
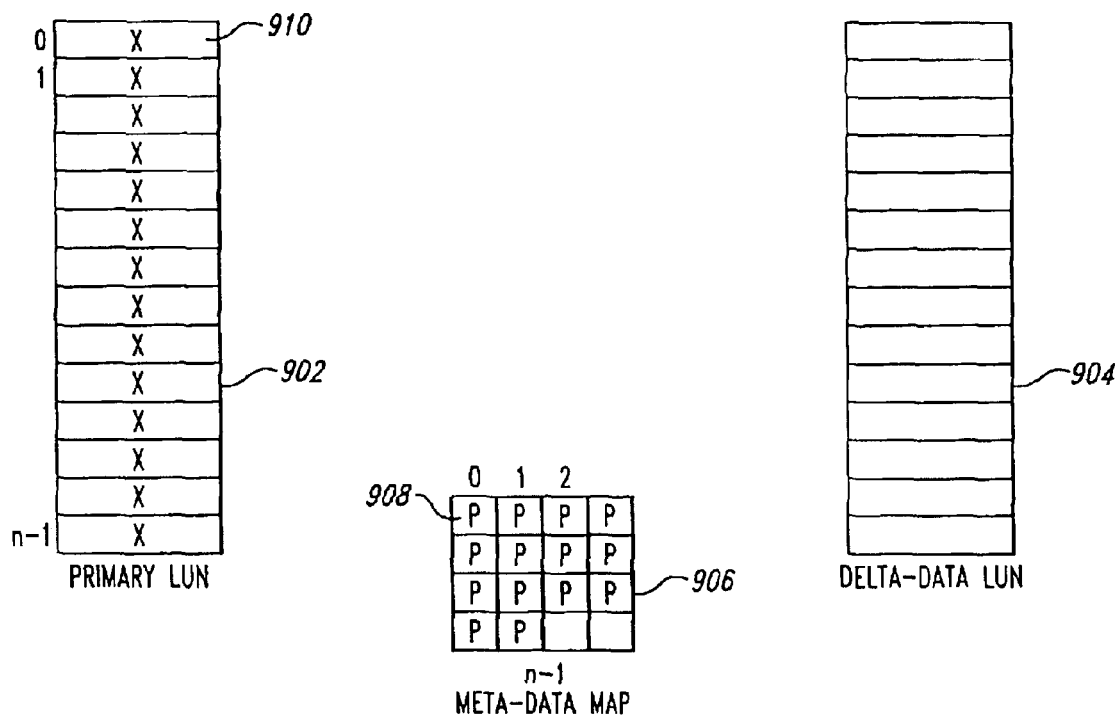

FIGS. 9A–J illustrate the currently available, snapshot-LUN-copy operation within mass-storage devices, such as disk arrays. Initially, as shown in FIG. 9A, a single primary LUN is resident within the mass-storage device. At an arbitrary point in time, a user or system administrator may launch a snapshot-LUN-copy operation, resulting in the mass-storage device controller dynamically allocating a delta-data LUN and meta-data map, as shown in FIG. 9B. The delta-data LUN 904 is initially empty. In certain embodiments, some initial number of data-storage units, such as sectors or blocks, may be physically allocated, and may be expanded as needed. In other cases, the entire extent of the delta-data LUN may be initially dynamically allocated. The delta-data LUN, as discussed above, may be distributed among high-speed memory and physical-data-storage devices. The meta-data map 906 is generally allocated from high-speed electronic memory, although, in the case of large meta-data maps, the meta-data map may be backed-up and dynamically swapped with physical data storage. Initially, the entries of a meta-data map, such as entry 908 corresponding to data-storage unit 910 in the primary LUN 902, indicate that the data for the virtual, copy LUN resides within the primary LUN. In FIGS. 9B–J, an entry "P" in the meta-data map indicates that the data is still in the primary LUN, while an entry "S" indicates that the data may be found in the delta-data LUN. Of course, in an actual implementation, a binary bit map would be the natural choice for implementing the meta-data map, with bit values of "1" and "0" indicating the primary LUN and delta-data LUN.

Figure 9C:
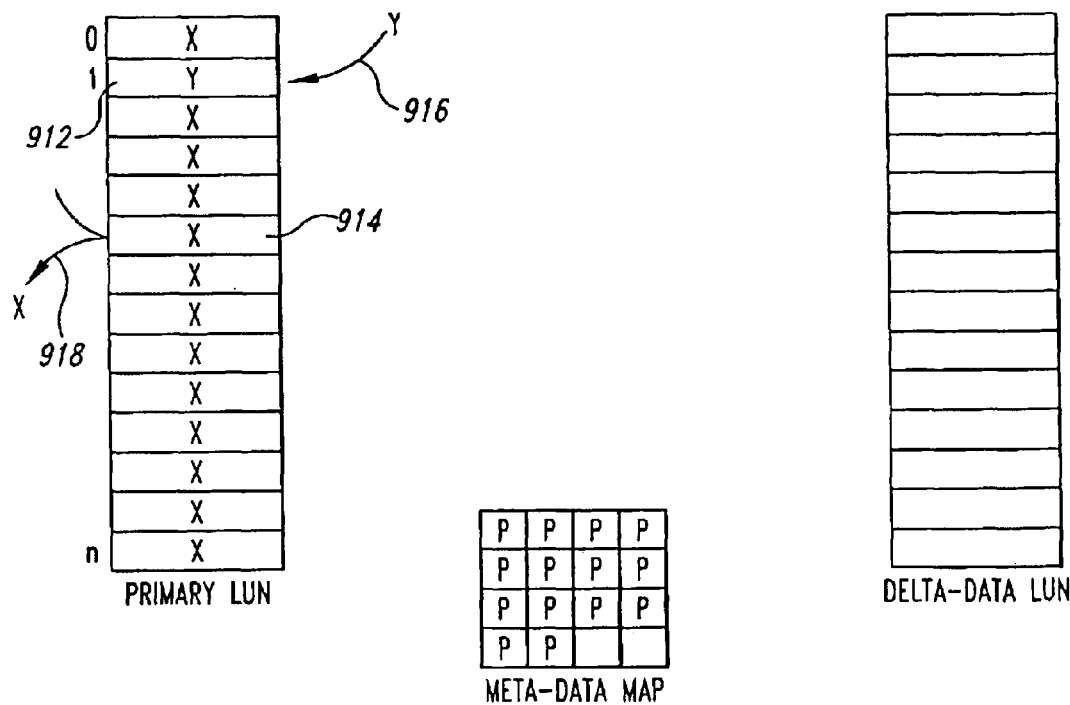

Prior to splitting the primary LUN from the snapshot LUN copy, as shown in FIG. 9C, READ and WRITE operations directed to the primary LUN continue to be carried out in the same manner that they are carried out prior to launching of the snapshot LUN copy. For example, as shown in FIG. 9C, a WRITE operation directed to the second data-storage unit 912 replaces the contents of that data-storage unit with new contents, and a READ operation, such as the READ operation 918 directed to the sixth data storage unit 914, returns the contents of the primary-LUN data storage unit. Prior to splitting the primary LUN from the snapshot-copy LUN, the snapshot-copy LUN provides READ-only access, and the READs are redirected to corresponding data-storage units of the primary LUN. Note that, in FIGS. 9C–J and in subsequent figures, the data originally present within the primary LUN is indicated by "X" entries, and new data is represented using letters other than "X." WRITE operations are indicated with arrows directed to LUN entries, such as arrow 916 in FIG. 9C, and READ operations are indicated by arrows directed into and out from LUN entries, such as arrow 918 in FIG. 9C.

Figure 9D:
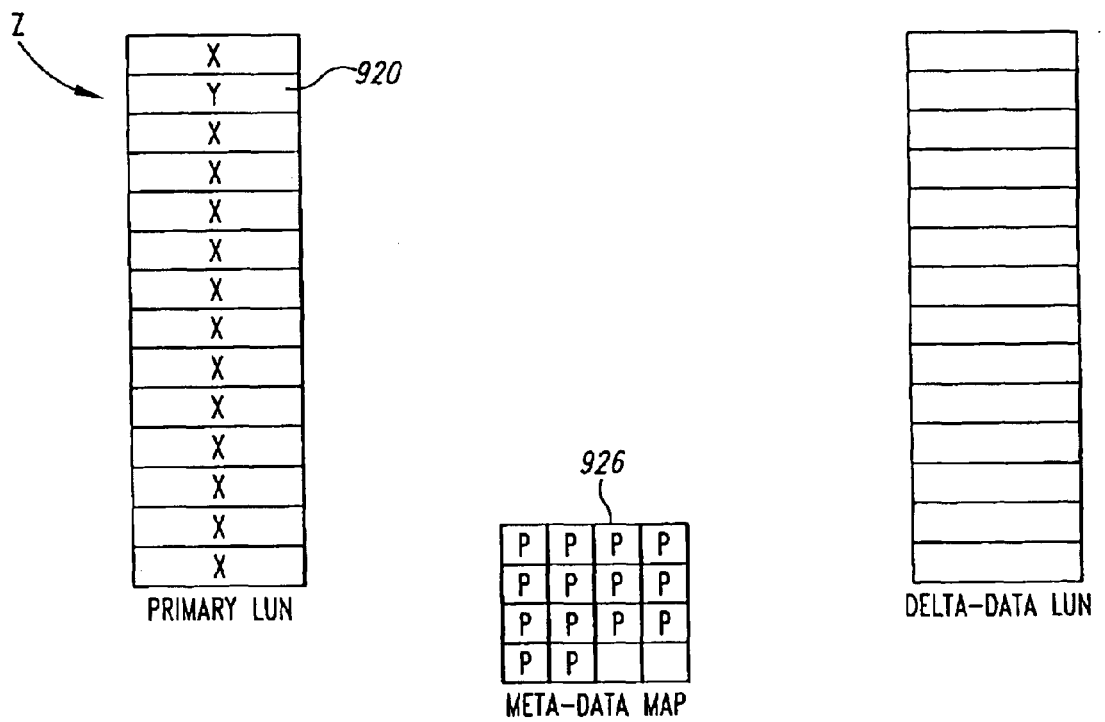
Figure 9E:
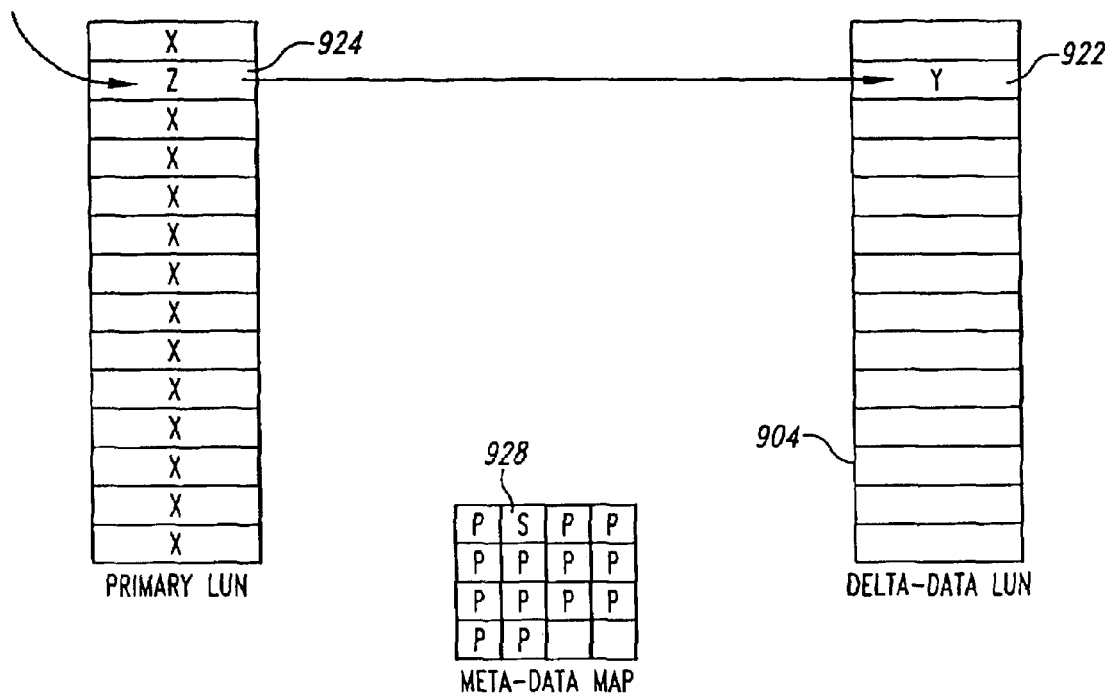
Figure 9F:
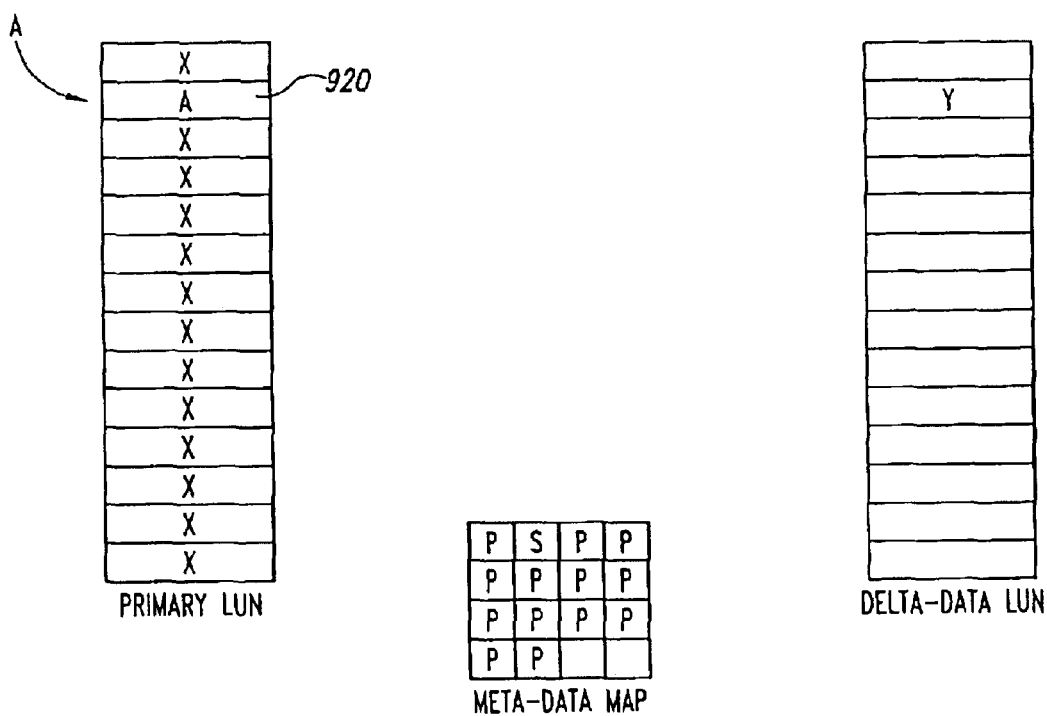
Figure 9G:
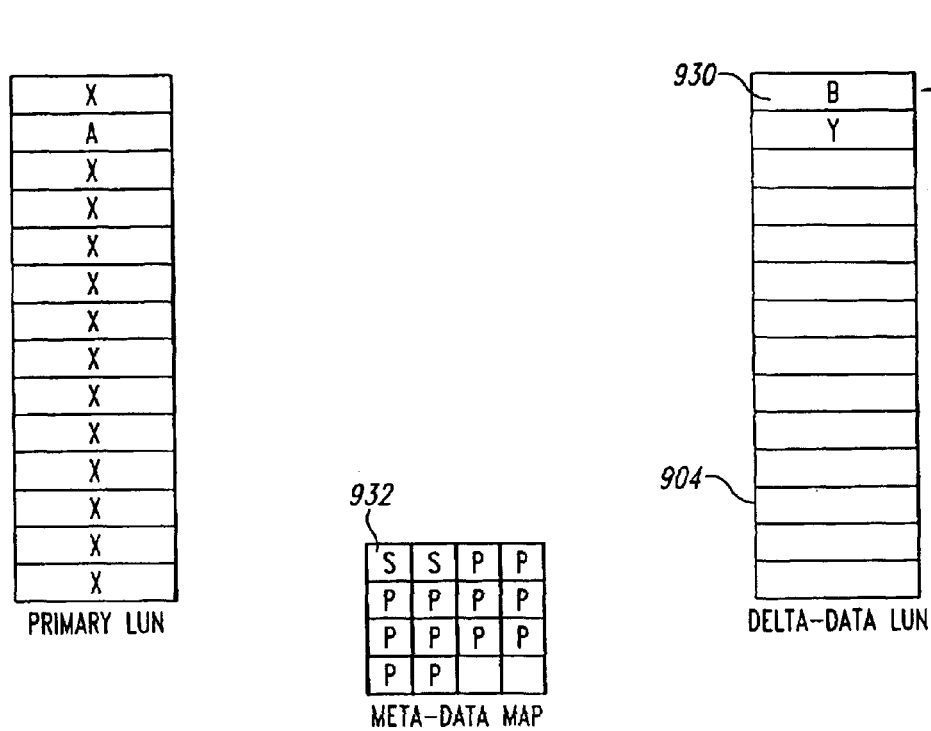
Figure 9H:
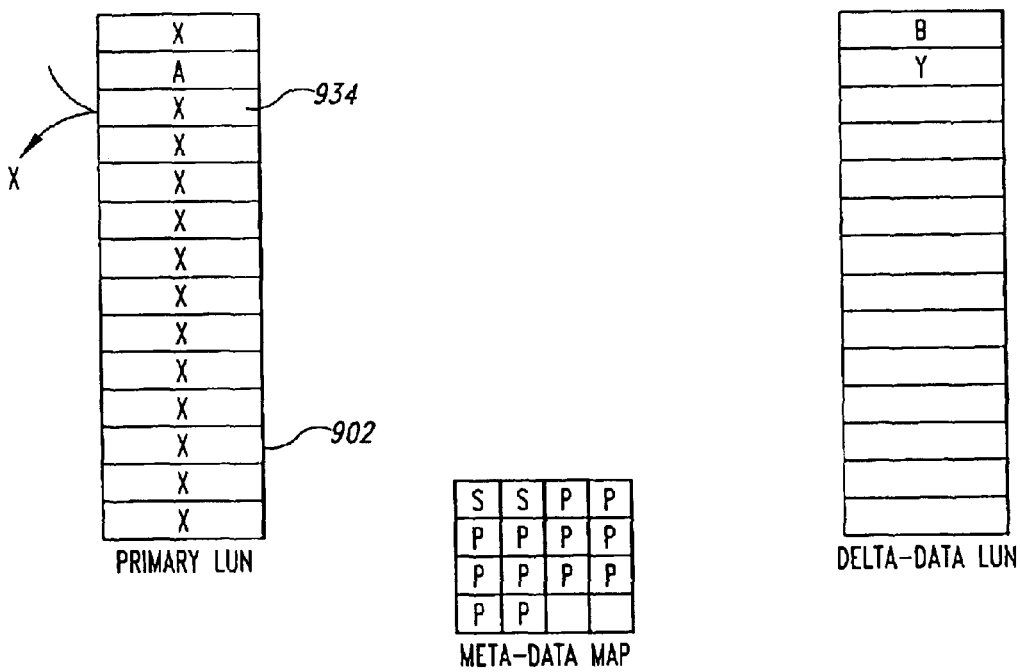
Figure 9I:
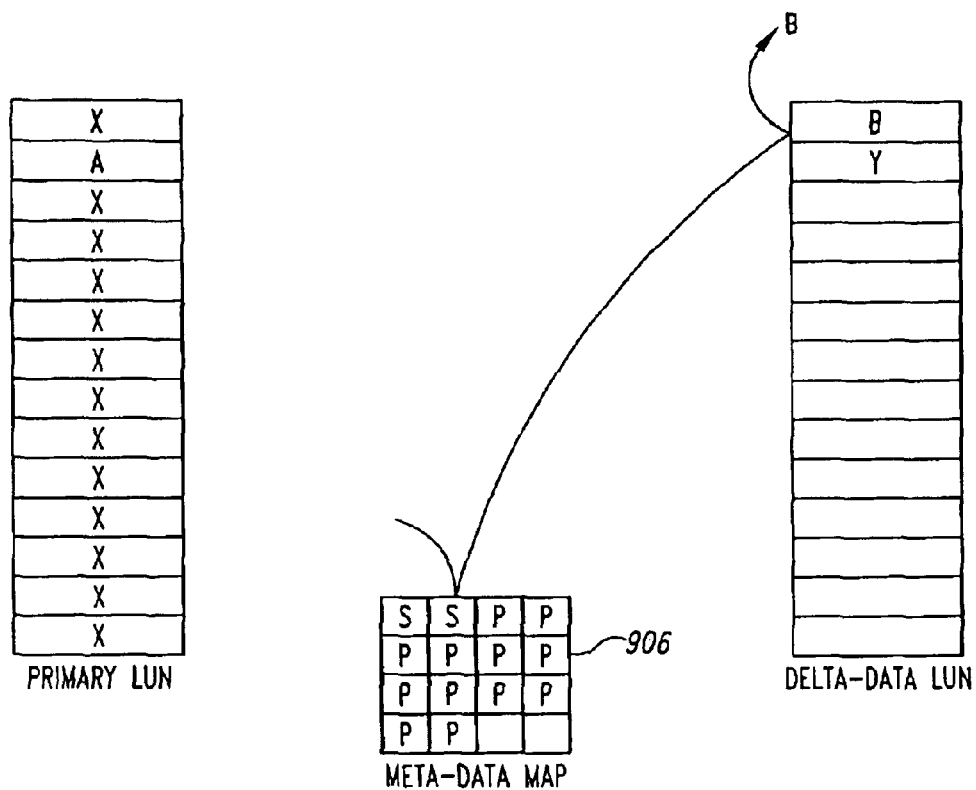
Figure 9J:
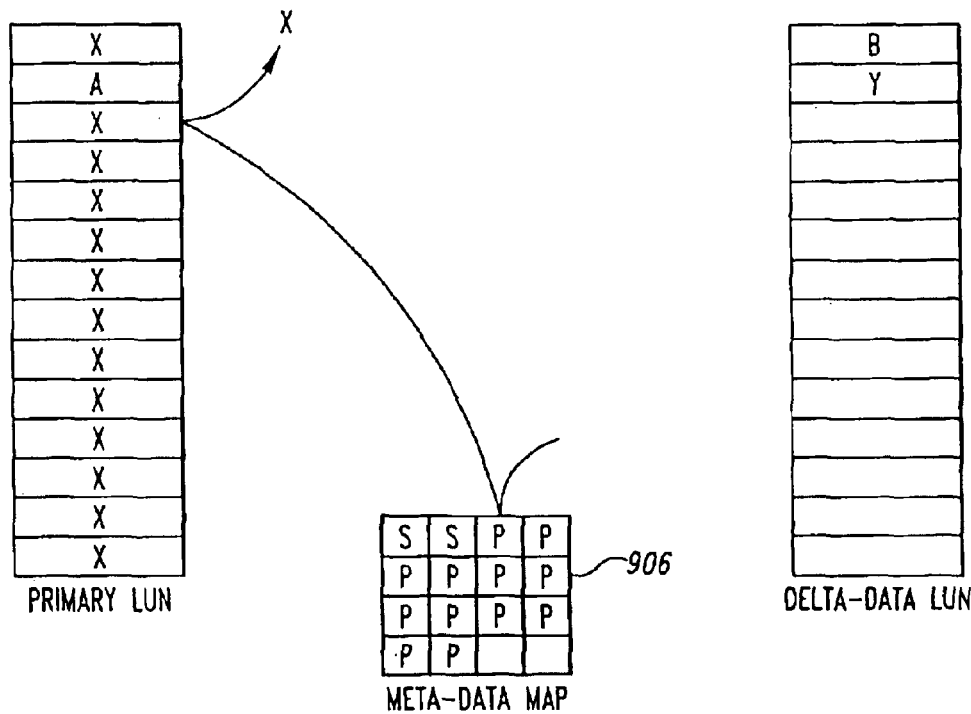

FIGS. 9D–J illustrate different types of accesses to the primary LUN and snapshot-copy LUN following a split operation directed to the primary-LUN/snapshot-copy-LUN pair. As shown in FIGS. 9D–E, a WRITE operation directed to the primary LUN, following the split operation, results in the WRITE of the data resident within the target data-storage unit 920 to the corresponding data-storage unit of the delta-data file 922 prior to overwriting the primary-LUN data-storage unit 924, in the case that the corresponding entry in the meta-data map 926 indicates that the primary LUN currently contains the data for the data-storage unit of the snapshot-copy LUN. After the transfer of the original data to the delta-data file, shown in FIG. 9E, the corresponding meta-data map entry 928 is changed to indicate that the data for the copy LUN now resides in the delta-data LUN 904. As shown in FIG. 9F, a WRITE operation directed to a data-storage unit of the primary LUN that has been overwritten following the split operation is carried out without any transfer of the existing data to the delta-data LUN. As shown in FIG. 9G, a WRITE directed to the snapshot-copy LUN following the split operation proceeds by writing the data to the specified data-storage unit 930 of the delta-data LUN 904 and updating the corresponding meta data file entry 932. As shown in FIG. 9H, a READ operation directed to the primary LUN following the split operation returns the data within the specified data-storage unit 934 of the primary LUN 902. As shown in FIGS. 9I–J, READs directed to the snapshot-copy LUN proceed by first accessing the meta-data map 906 and determining where the data is located. If the meta-data-map entry indicates the data is in the delta-data LUN, as shown in FIG. 9I, the data is read from the delta-data LUN. Otherwise, as shown in FIG. 9J, the data is read from the corresponding data-storage unit of the primary LUN.

Thus, a snapshot-copy LUN created by a snapshot-LUN-copy operation produces a virtual LUN implemented by the combination of the meta-data map and delta-data LUN. The data resident within the virtual LUN is distributed between the primary LUN and the delta-data LUN. The delta-data LUN and meta-data map are dynamically allocated, at run-time, by the mass-storage device controller. Because the data attributed to the virtual LUN is distributed between the delta-data LUN and primary LUN, a virtual, snapshot-copy LUN cannot be used as a reliable backup for a high-availability or fault-tolerant system. Instead, snapshot-copy LUNs find use as a mechanism to partly offload READ and WRITE access to a primary LUN for purposes such as allowing data to be backed up to secondary storage.

Figure 10A:
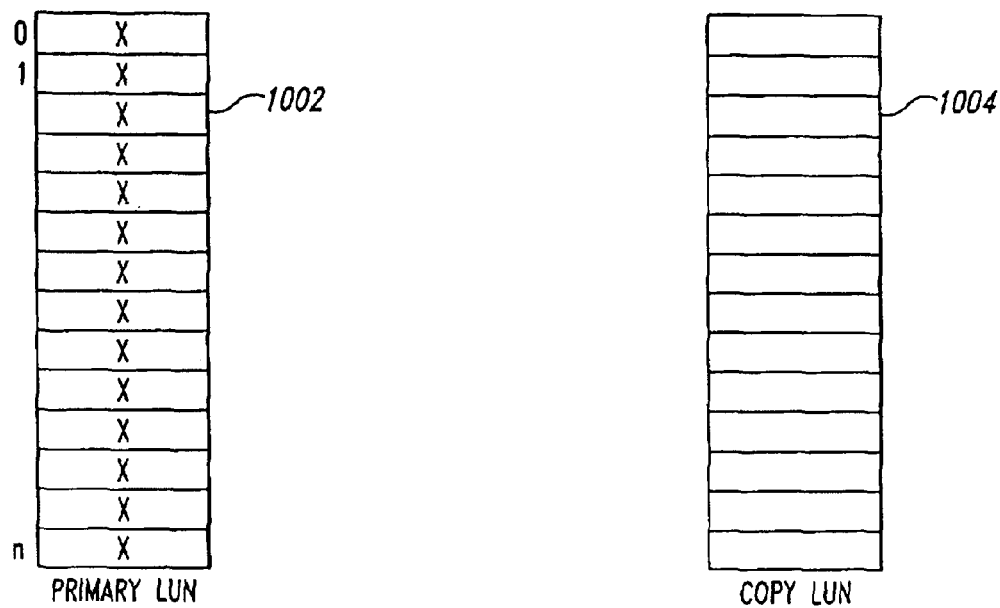
FIGS. 10A–H illustrate the currently available full-LUN-copy operation.

FIGS. 10A–H illustrate the currently available full-LUN-copy operation. As with the previously described snapshot-LUN-copy operation, the full-LUN-copy operation begins with an existing primary LUN 1002, as shown in FIG. 10A. In addition, however, a full-copy-LUN employs a pre-allocated copy LUN 1004. As discussed above, pre-allocation of the copy LUN allows for the copy LUN to be strategically placed within the physical data-storage components of a mass-storage device to ameliorate potential resource contention and other performance problems associated with less-than-optimal logical-two-physical-mappings of the copy LUN to physical data-storage components.

Figure 10B:
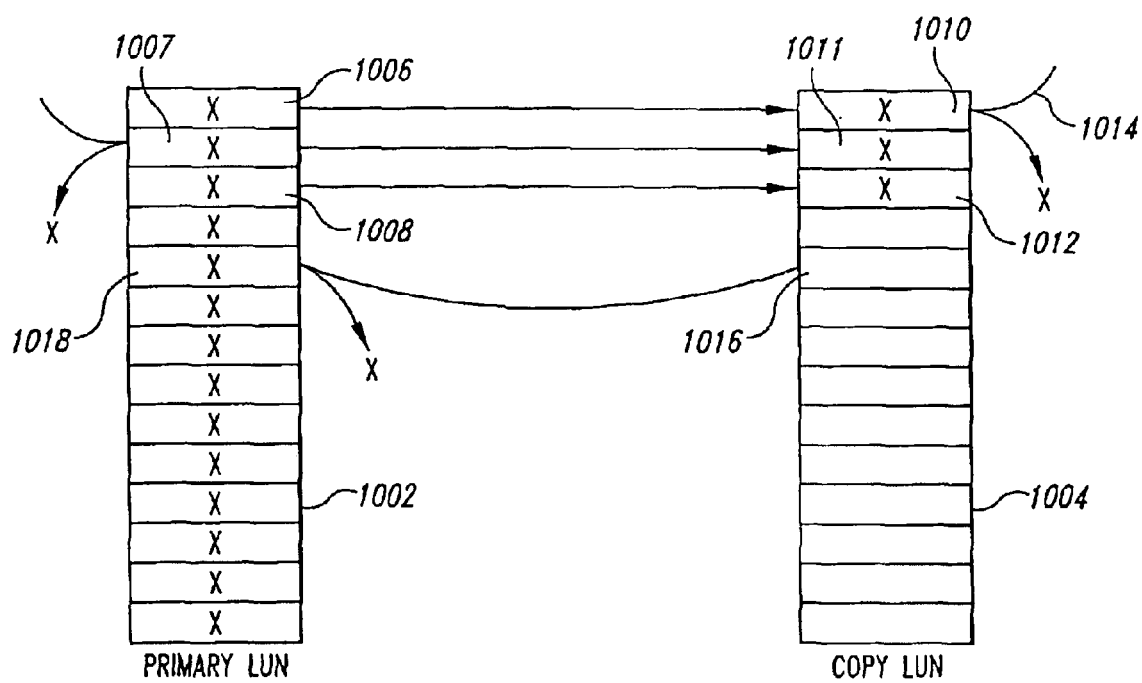
Figure 10C:
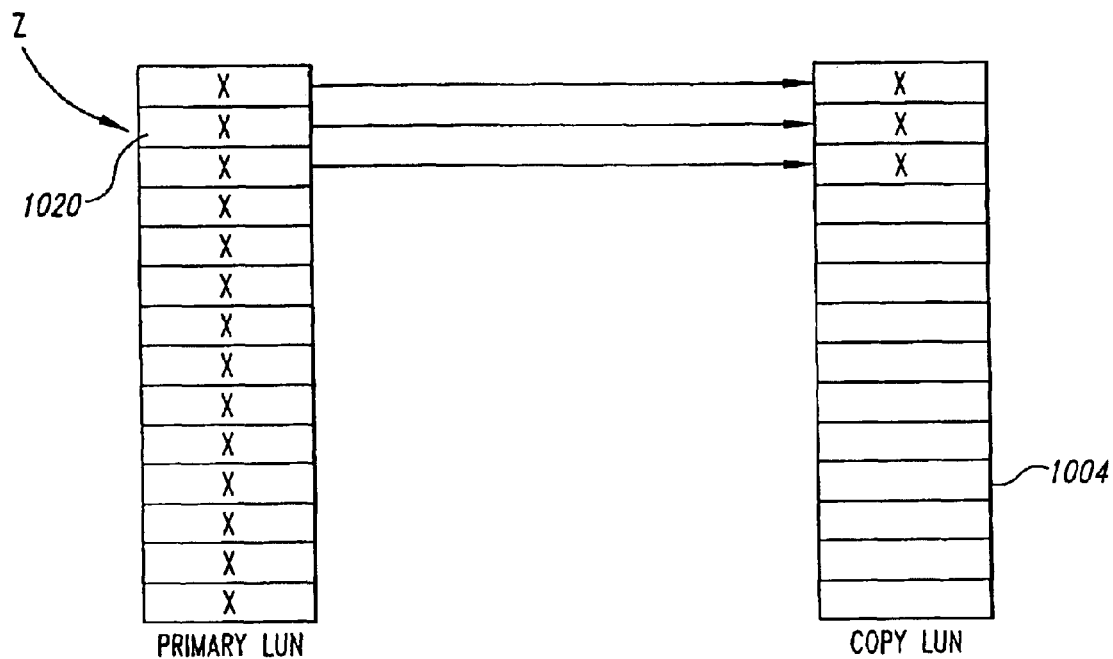
Figure 10D:
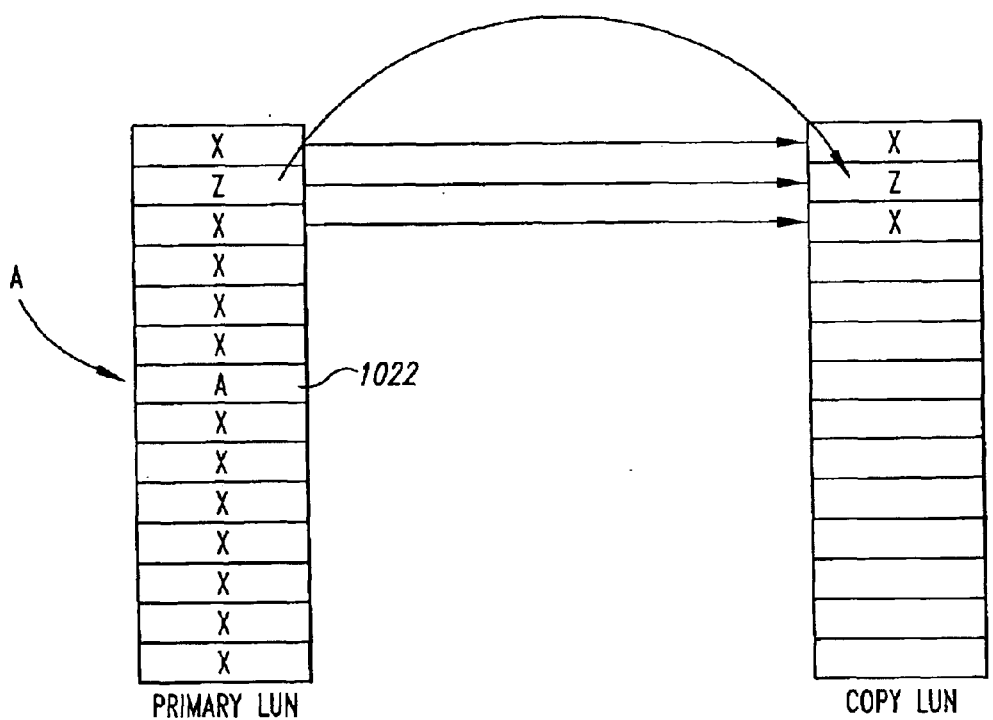

At an arbitrary point in time, a user or system administrator may launch the full-LUN-copy operation. As shown in FIG. 10B, the full-LUN-copy operation involves transferring data stored in each data-storage unit of the primary LUN 1002 to the copy LUN 1004. In FIG. 10B, the first three data-storage units 1006–1008 have been copied to corresponding data-storage units 1010–1012 within the copy LUN. During the copy operation, the primary LUN is available for READ and WRITE access while the nascent copy LUN 1014 is available for READ access only. Data already transferred from the primary LUN to the copy LUN can be read directly, as shown by the representation 1014 of a READ access to the first data-storage unit in FIG. 10B, while a READ directed a data-storage unit 1016 not yet containing data copied from the primary LUN may, in certain implementations, be redirected to the corresponding data-storage unit 1018 of the primary LUN, while, in other implementations, the READ operation may simply fail. As shown in FIGS. 10C–D, a WRITE operation directed to a data-storage unit 1020 of a primary LUN already copied to the copy LUN 1004 must be carried both on the primary LUN and the copy LUN. However, as shown in FIG. 10D, a WRITE directed to a data-storage unit 1022 of the primary LUN that has not yet been copied to a copy LUN can be carried out directly on the primary LUN, as it will be later copied to the copy LUN.

Figure 10E:
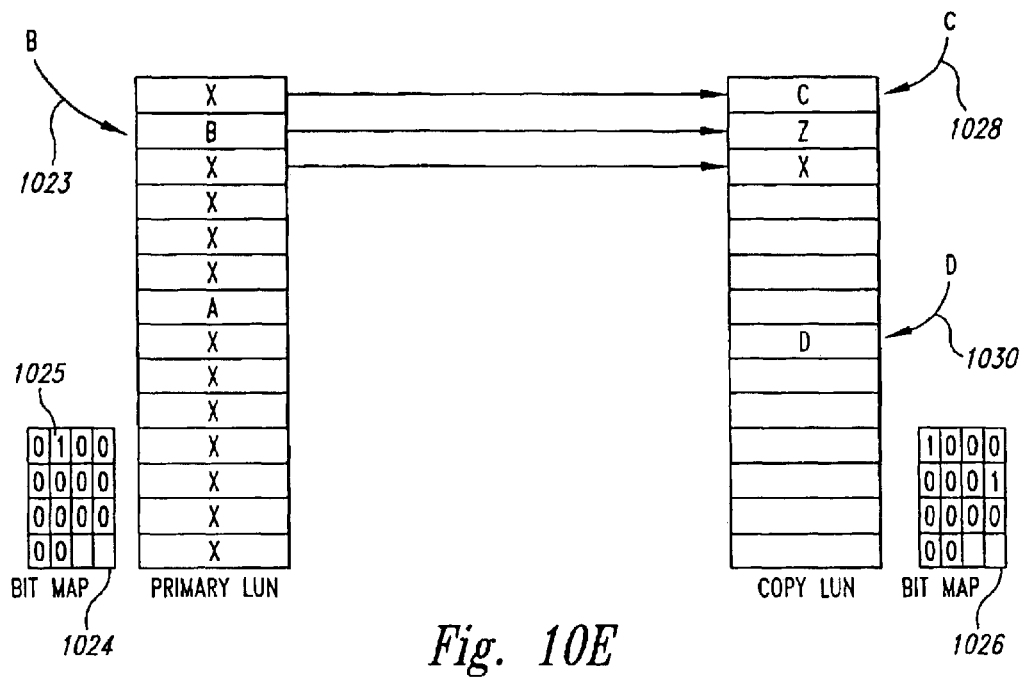
Figure 10F:
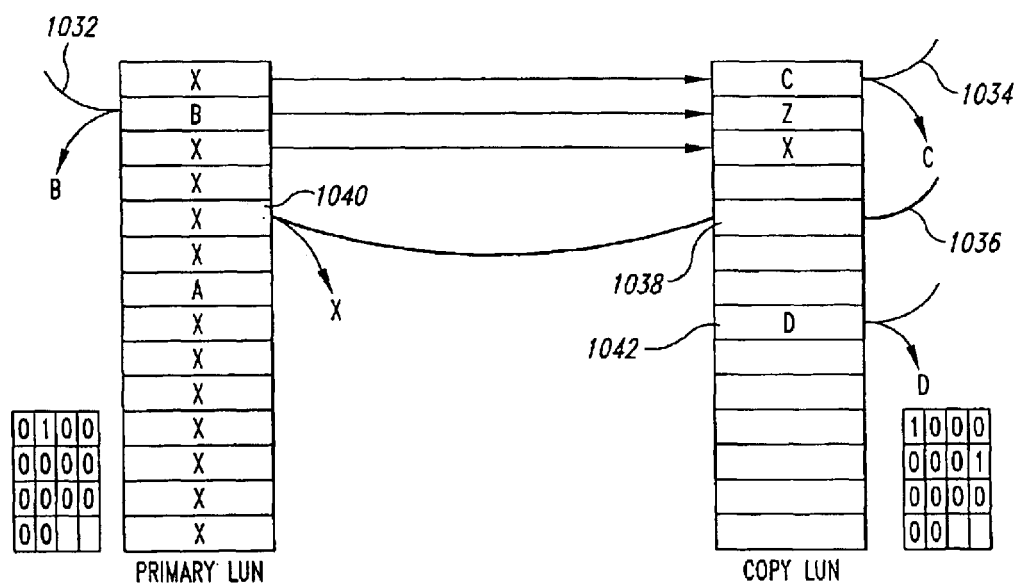
Figure 10G:
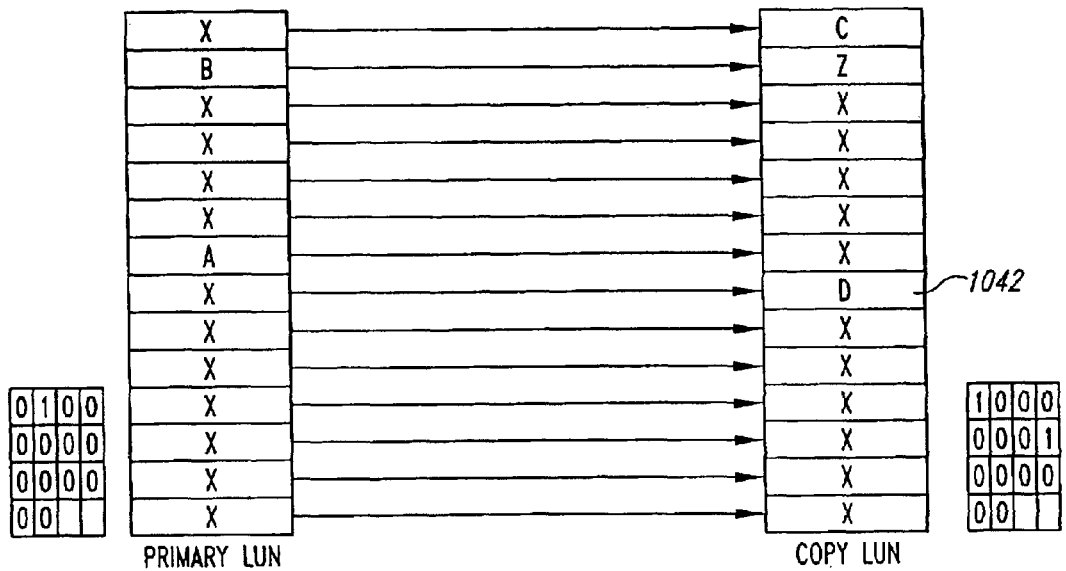
Figure 10H:
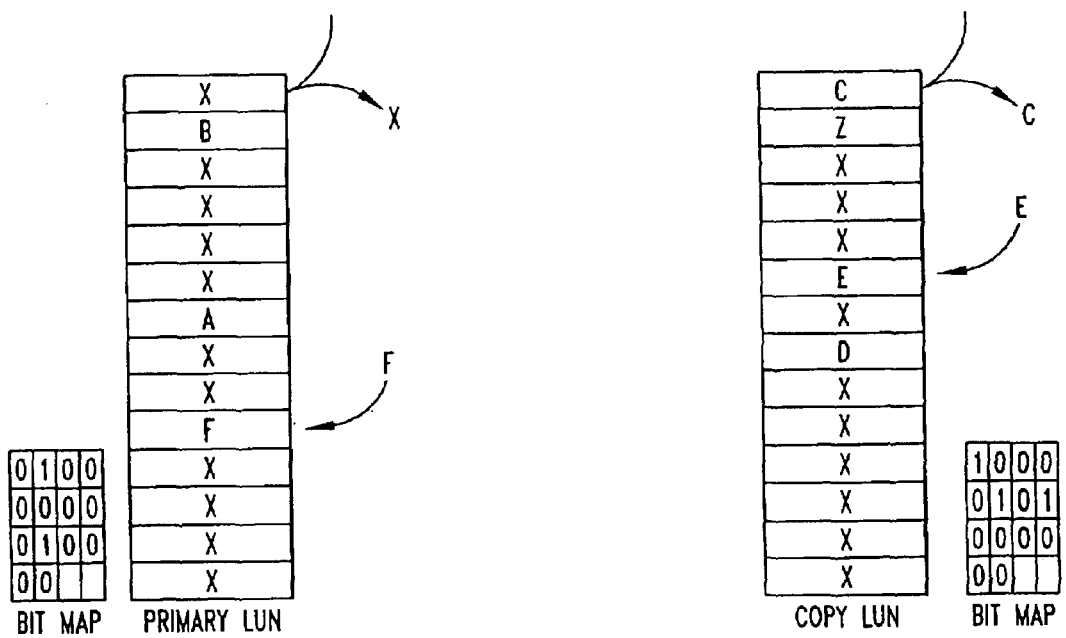

FIGS. 10E–H illustrate access operations directed to the primary LUN and copy LUN following a split operation. Once the copy LUN is split Cram the primary LUN, both the primary LUN and copy LUN provide READ and WRITE access. In addition, bit maps 1024 and 1026 are associated with each of the primary LUN and copy LUN to indicate data-storage units overwritten since the split operation. After the split operation, as shown in FIG. 10E, a WRITE 1023 to the primary LUN is executed only on the primary LUN, and the corresponding entry 1025 in the associated bit map 1024 is set to indicate divergence of the data since the split operation. Similarly, WRITEs 1028 and 1030 directed to the copy LUN are carried out only on the copy LUN. As shown in FIG. 10F, a READ operation 1032 directed to the primary LUN is carried only on the primary LUN. A READ 1034 directed to a data-storage unit of the copy LUN that has already received data from the primary LUN during the copy operation is carried out only on the copy LUN, while a READ access 1036 directed to a data storage unit 1038 not yet having received data from the primary LUN, in that the split operation is not yet complete, is redirected to the corresponding data-storage unit 1040 of the primary LUN. The copy operation proceeds to completion, as shown in FIG. 10G, with any data written to the copy LUN since the split operation, such as the data represented as "D" in data-storage unit 1042, not overwritten by data transferred from the primary LUN in the process of the copy operation. Once data copying is complete, the primary LUN and copy LUN are both completely independently accessible for READ and WRITE operations, as shown in FIG. 10H.

The full-LUN-copy operation thus generates a complete, independent copy of the primary LUN. The copy LUN can be used as a robust and consistent duplicate of the primary LUN for high-availability and fault-tolerant systems. However, the copy operation may be of significant duration, and during the copy operation, READ access to the copy LUN may be restricted to only those data-storage units already transferred from the primary LUN to the copy LUN. Moreover, during the copy operation, WRITES directed to the primary LUN must be duplicated to the copy LUN, doubling the overhead and load on system resources for WRITE accesses. Finally, the copy LUN is not accessible for WRITE operations during the copy operation.

Designers, manufacturers, and users of mass-storage devices, such as disk arrays, recognize the need for a copy operation that produces a full, robust and complete copy of a primary LUN, but that does not involve a lengthy copy period during which WRITE access is restricted, and WRITES to the primary LUN are duplicated, causing potential resource-contention problems. Two embodiments of the present invention, descriptions of which follow, provide a full, complete copy of a primary LUN to a copy LUN without a user being aware of the lengthy copy-operation period incurred in currently available full-LUN-copy operations.

Figure 11A:
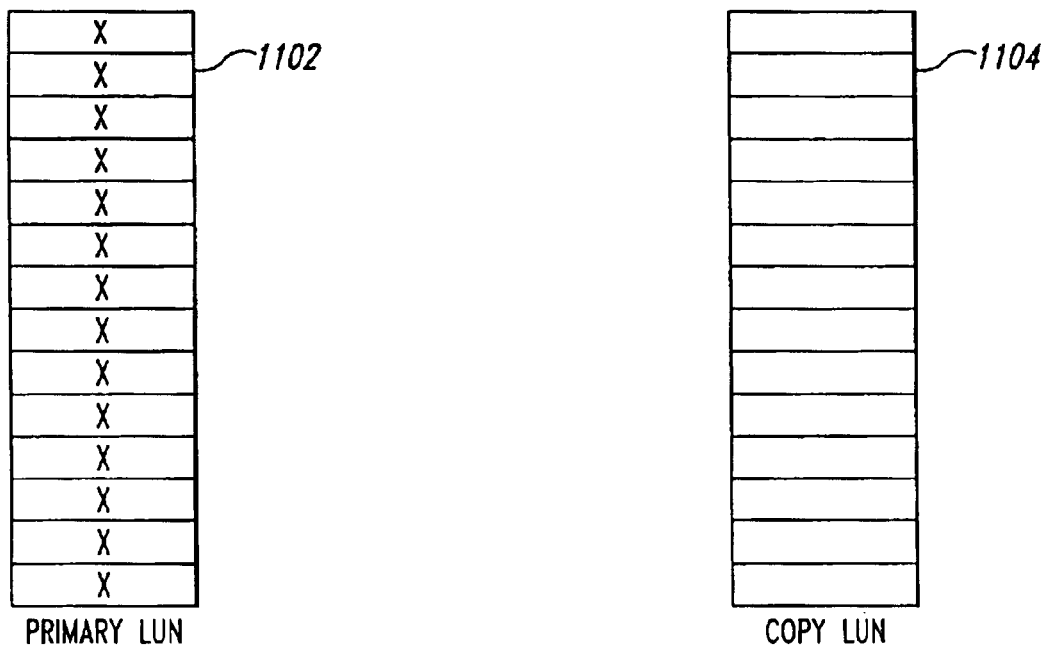
FIGS. 11A–G illustrate an immediate-full-LUN-copy operation that represents one embodiment of the present invention.

FIGS. 11A–G illustrate a first, immediate-full-LUN-copy operation that represents one embodiment of the present invention. As with the currently available, full-LUN-copy operation, the immediate-full-copy-LUN operation provided by the present invention begins, as shown in FIG. 11A, with a primary LUN 1102 and a statically pre-allocated copy LUN 1104.

Figure 11B:
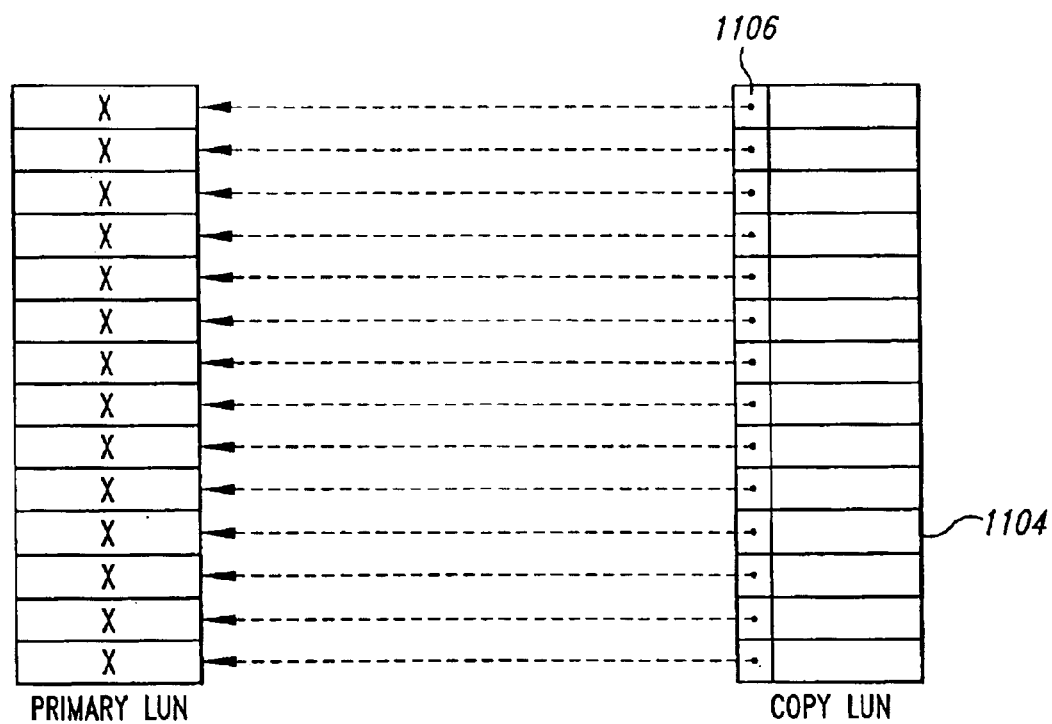

However, unlike the currently available full-LUN-copy operation, in the immediate-full-LUN-copy operation, as shown in FIG. 11B, the copy LUN 1104 is initialized to contain pointers, or references, from each data-storage unit back to the corresponding data-storage units in the primary LUN containing the data that will be eventually copy to the copy-LUN data-storage units. Initialization of the copy LUN, as shown in FIG. 11B, is nearly instantaneous, because the references, or pointers, can be constructed in electronic, cache memory rather than physically written to data-storage devices allocated for the copy LUN. Thus, as shown in FIG. 11B, after execution of the pointer copy operation, the copy LUN 1104 is a full, virtual LUN with a complete set of references, such as reference 1106, to data within the primary LUN. Note that the cached references provide immediate physical addresses that can be used by the disk-array controller to quickly access the data from the primary LUN. In the currently available full-LUN-copy operation, less direct, and less efficient means for redirecting READ operations are employed.

Figure 11C:
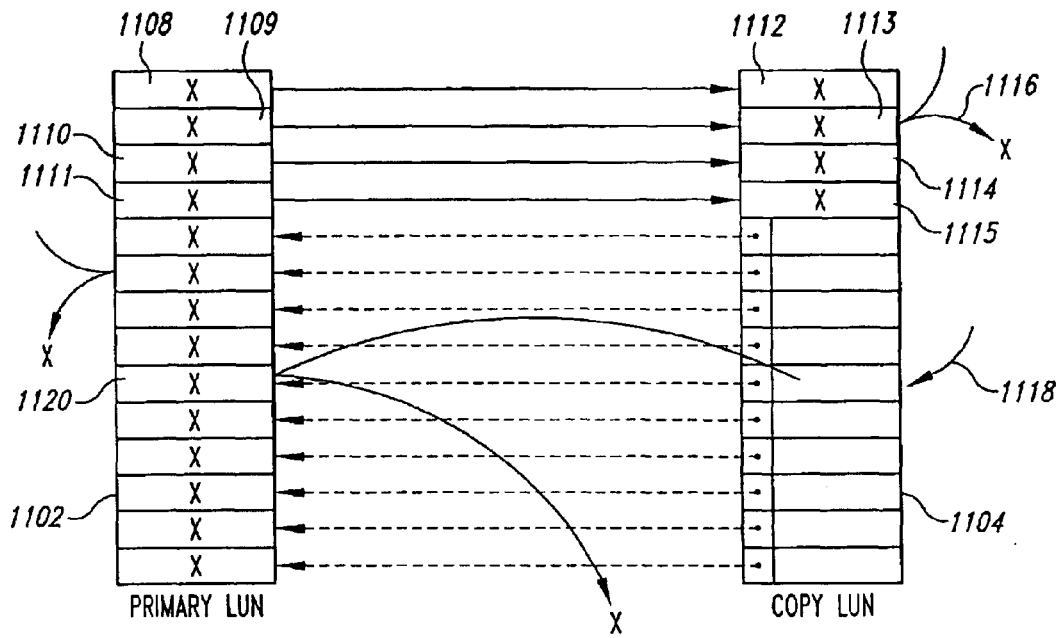

Copying of data from the primary LUN to the copy LUN proceeds much as in the copy operation of the full-LUN-copy operation discussed with reference to FIGS. 10A–G. In FIG. 11C, the first four data-storage units 1108–1111 have been copied to corresponding data-storage units 1112–1115 of the copy LUN 1104, overriding the references initially present in those data-storage units following initialization of the copy LUN, as shown in FIG. 11B. In this embodiment, the copy LUN 1104 provides full READ access until data copying is complete. The virtual LUN is an intermediate, transient state that exists between the time that the immediate-full-LUN-copy operation is launched and the time that data copying from the primary LUN to the copy LUN has finished. The primary LUN, of course, provides both READ and WRITE access. A READ operation directed to the primary LUN during the copying of data from the primary LUN to copy LUN executes directly against the primary LUN. A READ to a data-storage unit of the copy LUN, such as READ 1116 in FIG. 11C, proceeds directly. A READ directed to a data-storage unit that has not yet received data from the primary LUN, such as READ 1118, is re-directed to the corresponding data-storage unit 1120 of the primary LUN.

Figure 11D:
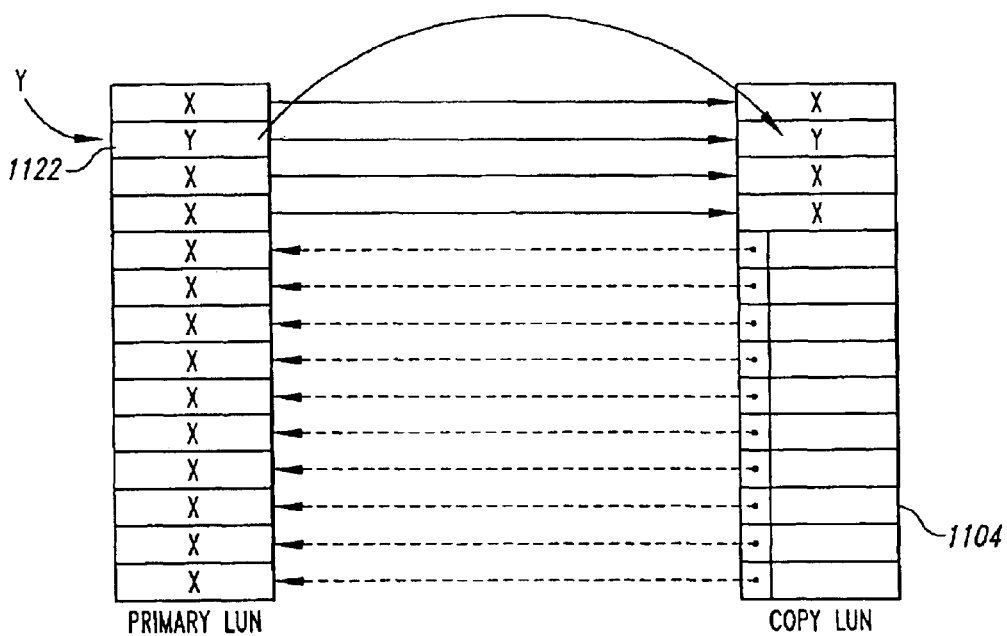
Figure 11E:
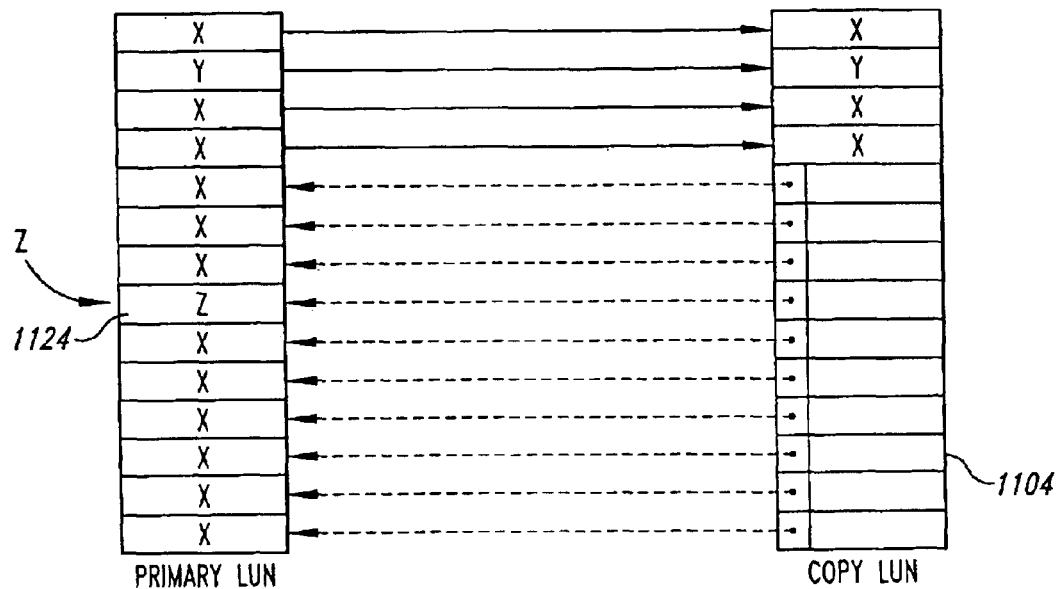
Figure 11F:
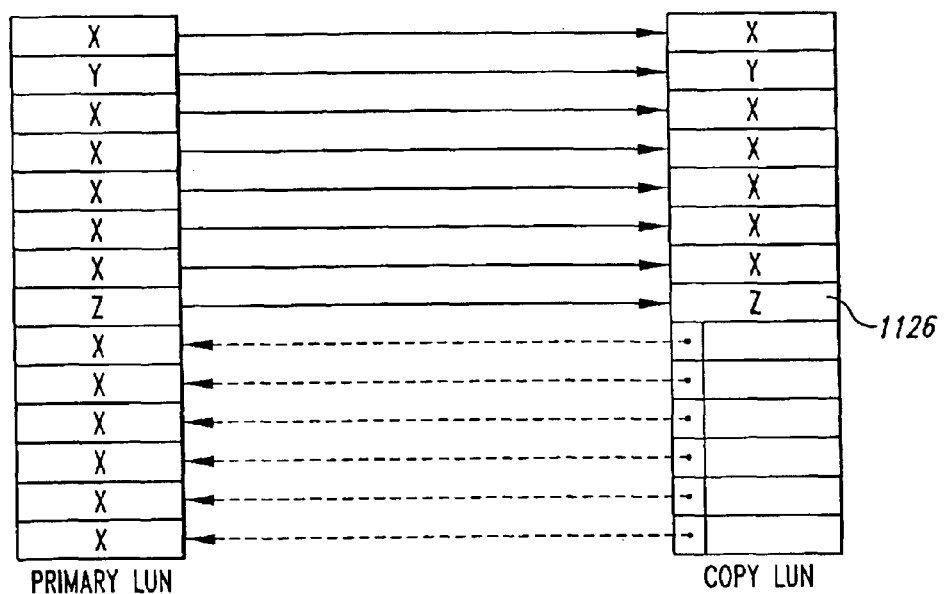
Figure 11G:
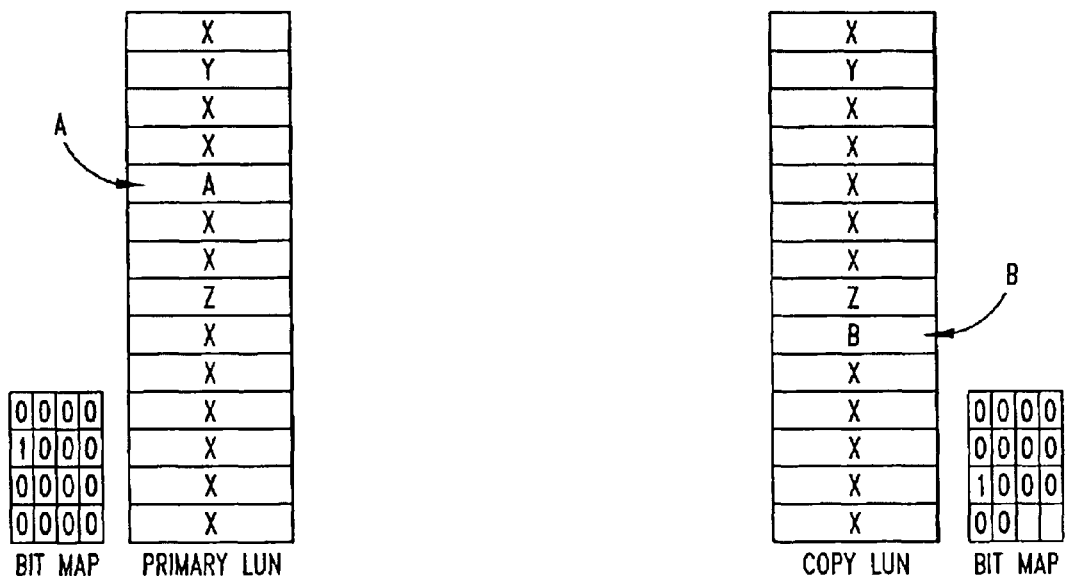

As shown in FIG. 11D, a WRITE to a data-storage unit 1122 that has already been copied to the copy LUN 1104 must be executed both with respect to the primary as well as with respect to the copy LUN. However, as shown in FIG. 11E, a WRITE directed to a data-storage unit 1124 not yet copied to the copy LUN can proceed directly with respect to the primary LUN since, as shown in FIG. 11F, the overwritten data will eventually migrate to the copy LUN 1126 during the course of the data copy operation. When the copy has completed, the primary-LUN/copy-LUN pair can be split, by issuing a split operation to the pair, to produce two independent LUNs, each with an associated bit map that records data-storage units overwritten following the split operation, as shown in FIG. 11G.

Thus, in comparison to the currently available full-LUN-copy operation, the immediate full-LUN-copy operation provided by the present invention creates a transient, virtual LUN immediately following launch of the intermediate-full-LUN-copy operation, allowing full READ access to the copy LUN while data is copied from the primary LUN to the copy LUN. Unlike the snapshot-LUN-copy operation, described above, the immediate-full-LUN-copy operation allows for static pre-allocation of the copy LUN, providing an opportunity to a user or system administrator to strategically place the copy LUN on physical data-storage components of a mass-storage device in order to minimize contention for resources.

Figure 12A:
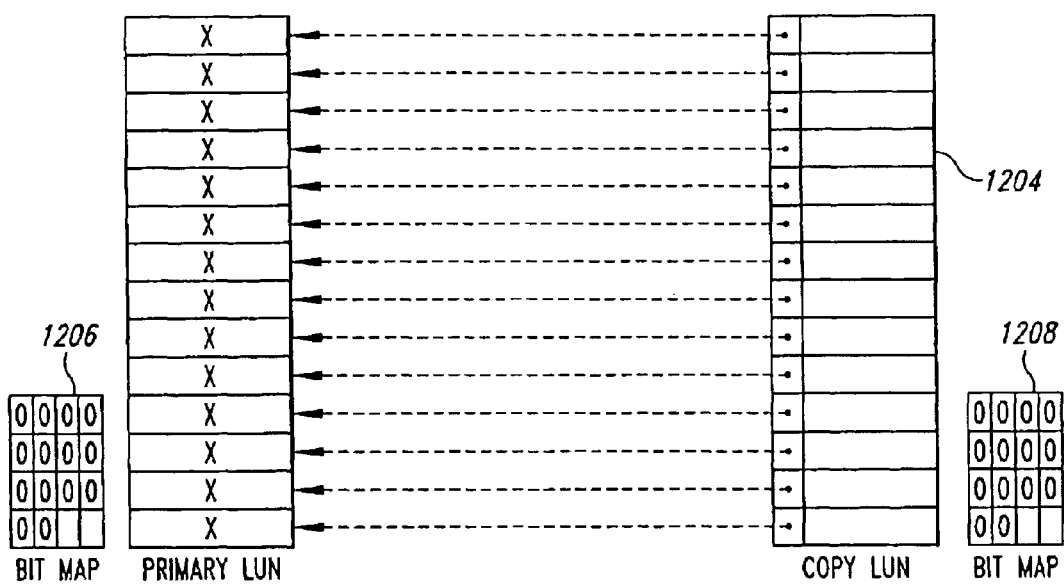
FIGS. 12A–E illustrate an immediate-full-LUN-copy-and-split operation that represents a second embodiment of the present invention.
Figure 12B:
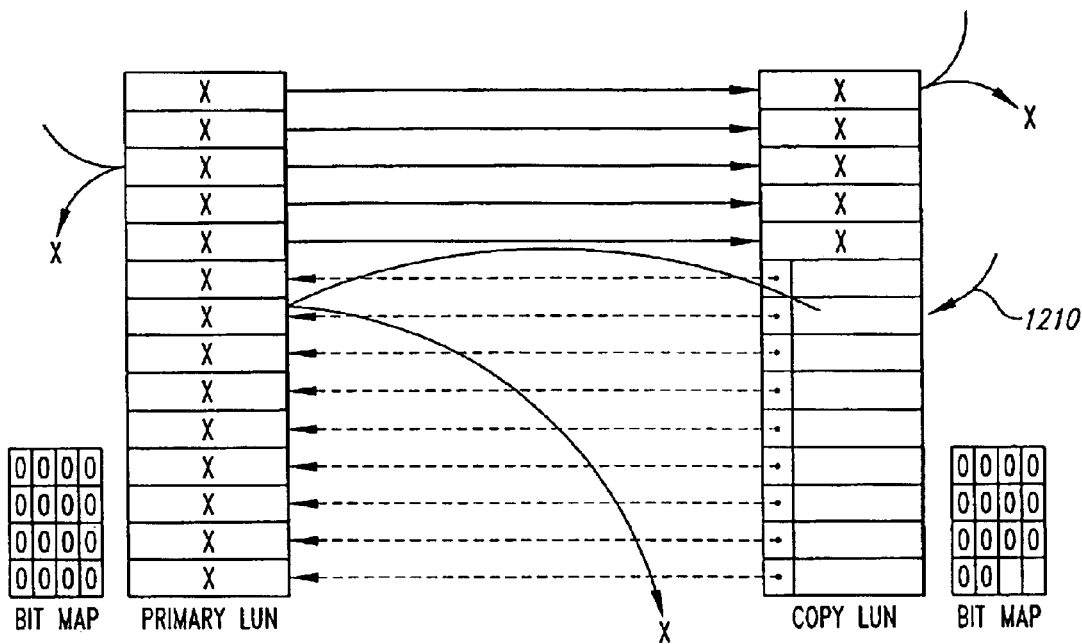
Figure 12C:
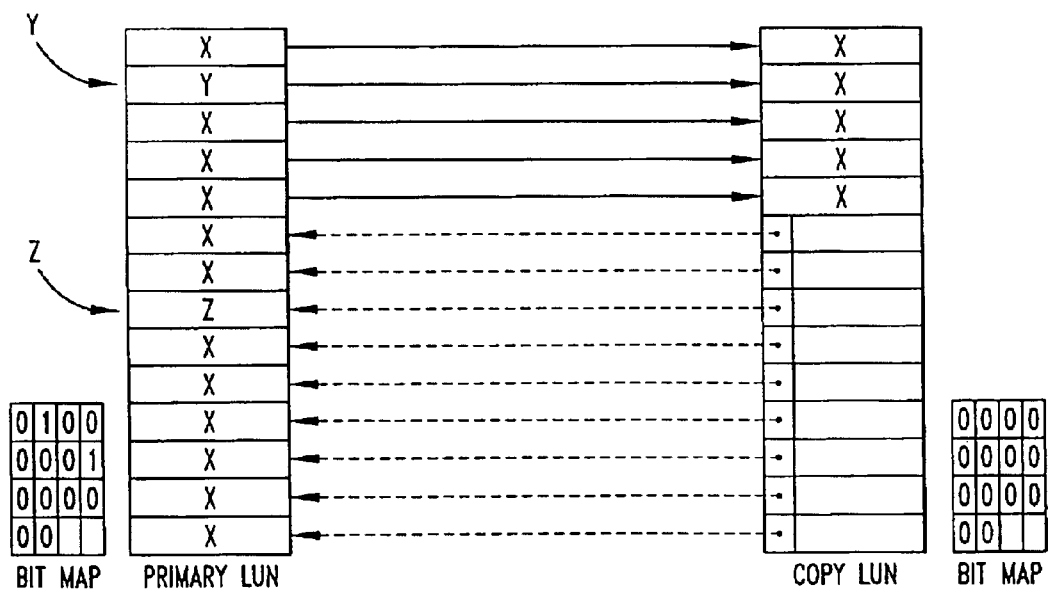
Figure 12D:
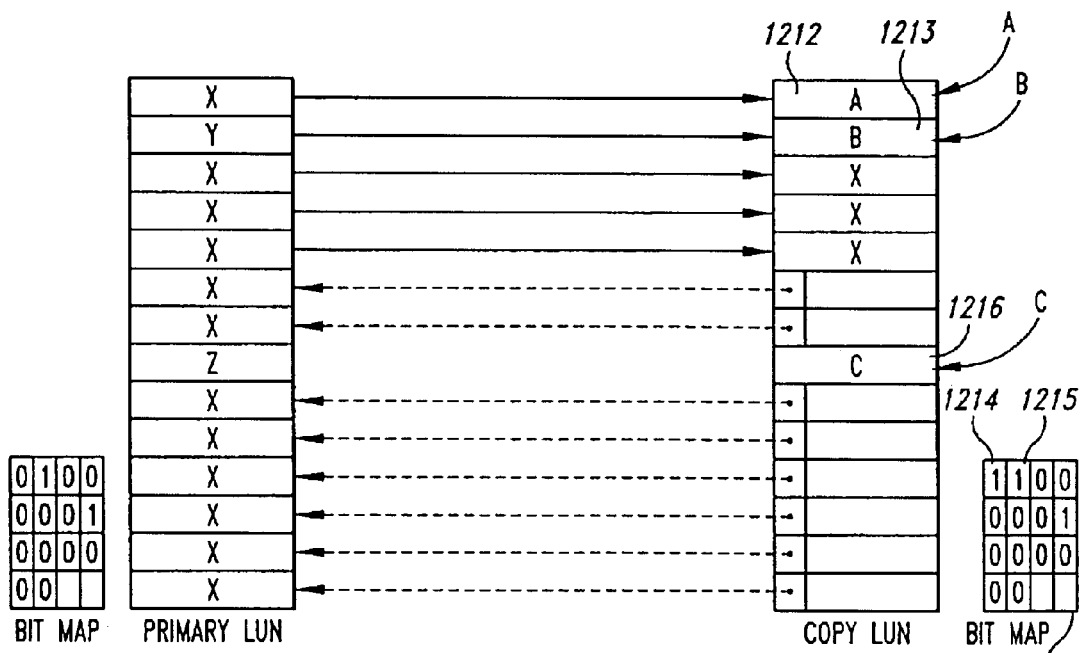
Figure 12E:
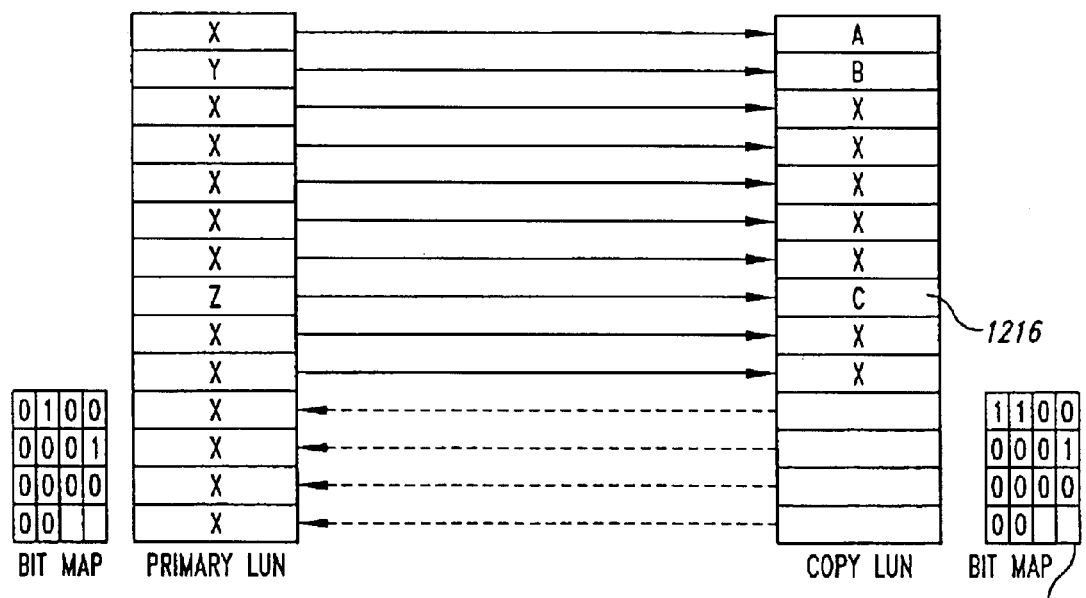

FIGS. 12A–E illustrate a second embodiment of the present invention that provides an immediate-full-LUN-copy-and-split operation. In this embodiment, as shown in FIG. 12A, the pre-allocated copy LUN is initialized with references, or pointers, in cache memory referring back to the data-storage units of the primary LUN containing the data until the data is copied from the primary LUN to the copy LUN. Thus, the copy LUN 1204 is initialized in the same fashion that the copy LUN is initialized in the previously described immediate-full-LUN-copy operation, described above with reference to FIG. 11B. However, note that, in FIG. 12A, associated bit maps 1206 and 1208 are immediately allocated to identify data-storage units of both the primary LUN and copy LUN overwritten following launch of the immediate-full-LUN-copy-and-split operation. Both the primary LUN and copy LUN provide READ and WRITE accesses immediately following launch of the immediate-full-LUN-copy-and-split operation. As shown in FIG. 12B, READ operations proceed normally when directed to the primary LUN, and when directed to already copied data within the copy LUN, while READs directed to data-storage units of the copy LUN, such as READ 1210, are redirected to the corresponding data-storage unit of the primary LUN. As shown in FIG. 12C, WRITES to a primary LUN do not involve any secondary WRITES to the copy LUN. As shown in FIG. 12D, WRITEs to the copy LUN also proceed normally. WRITES to data-storage units, such as data-storage units 1212–1213, already containing copied data simply overwrite the data copied from the primary LUN, with update of the corresponding entries 1214 and 1215 of the associated bit map 1208. WRITE operations directed to a data-storage unit 1216 not yet having received data from the primary LUN also proceed normally, overwriting the references, or pointers, initially stored in the data-storage unit. Later, as data is copied from the primary LUN to the copy LUN, the overwritten data-storage unit is not again overwritten by data transmitted from the primary LUN. Such overwritten data-storage units can be detected by reference to the associated bit map 1208. FIG. 12E shows, for example, that data-storage unit 1216, overwritten in a direct WRITE to the copy LUN in FIG. 12D, is not again overwritten as the primary-LUN-to-copy LUN copy operation progresses past data-storage unit 1216.

Thus, the immediate-full-LUN-copy-and-split operation that represents the second embodiment of the present invention provides an immediate, full copy LUN that provides immediate READ and WRITE access. When the copy operation that copies data from the primary LUN to copy LUN eventually completes, the copy LUN represents a completely robust and consistent copy of the primary LUN. The copy LUN can then be used as a backup in a highly-available or fault-tolerant system.

Figure 13:
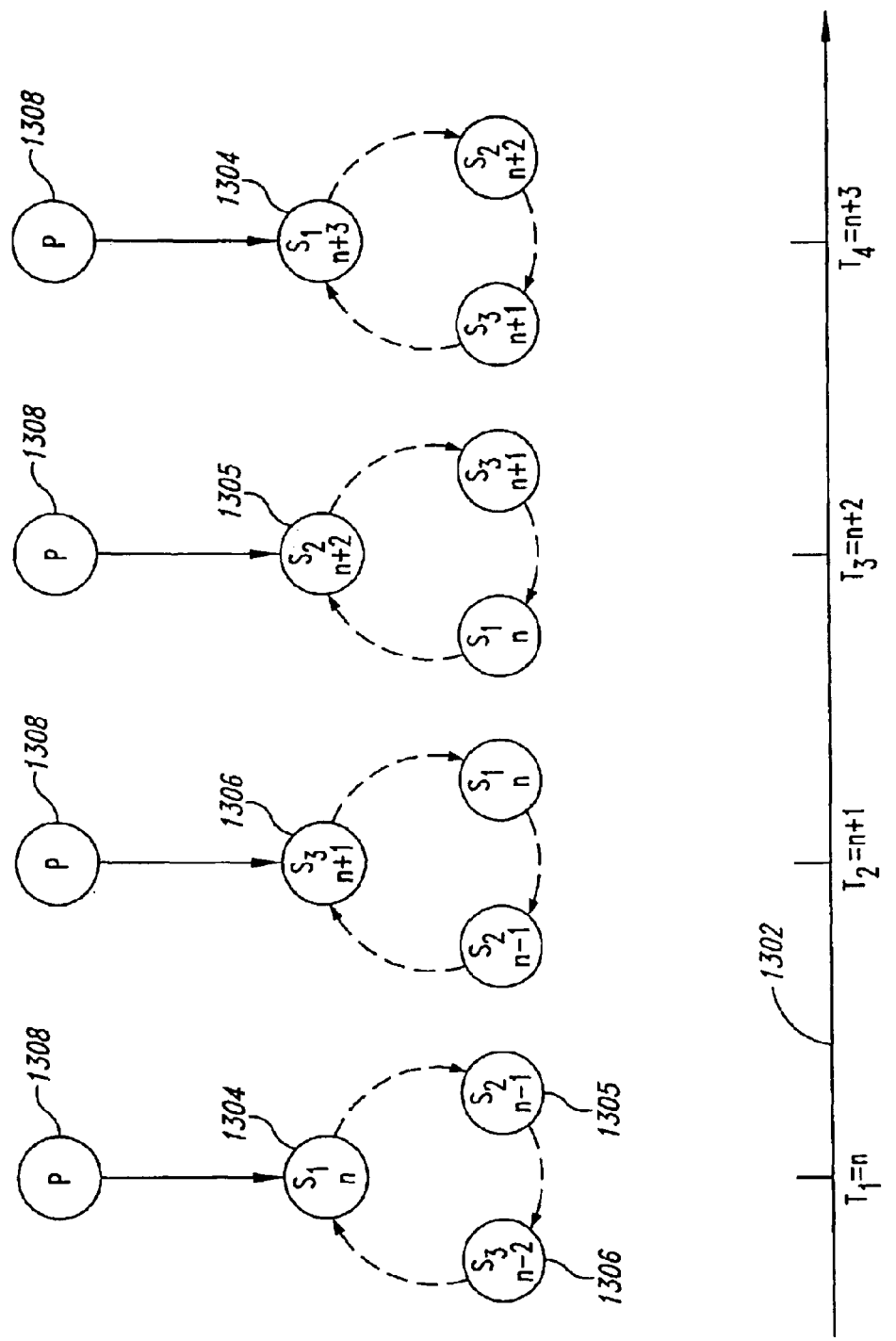
FIG. 13 illustrates operation of a copy-LUN group.

The immediate-full-LUN-copy operation and the immediate-full-LUN-copy-and-split operation provided as two embodiments of the present invention allow for flexible use of copy LUNs within a mass-storage device for creation of periodic and event-driven backup copy LUNs. For example, copy-LUN groups of arbitrary size can be established to provide a rotating, incremental set of backup LUNs. FIG. 13 illustrates operation of a copy-LUN group. In FIG. 13, a continuous timeline 1302 is shown at the bottom of the figure. The state of a copy-LUN group is shown at each of four time intervals $T_1$, $T_2$, $T_3$, and $T_4$. In FIG. 13, the time intervals are regularly spaced along the timeline. The copy-LUN group consists of three copy LUNs 1304–1306 designated $S_1$, $S_2$, and $S_3$. The copy LUNs 1304–1306 represent copies of a primary LUN 1308 at different points in time. At time $T_1$, the primary LUN 1308 is copied to copy LUN $S_1$ 1304 via one of the two immediate-full-LUN copy operations. Copy LUN $S_1$ contains the most recent copy of the primary LUN with copy LUNs $S_2$, and $S_3$ containing less recent copies of the primary LUN. At time $T_2$, the primary LUN 1308 is copied to copy LUN $S_3$ 1306. At time $T_3$, the primary LUN 1308 is copied to copy LUN $S_2$ 1305. Thus, at three successive times, the primary LUN has been copied to each of the copy LUNs. At time $T_4$, the primary LUN 1308 is again copied to copy LUN $S_1$ 1304, representing the start of a subsequent rotation of the copy-LUN group. Note that all three copy LUNS within the copy-LUN group can be statically pre-allocated to minimize resource contention with the mass-storage device. This allows for an essentially continuous and automated backup of the primary LUN at the expense of pre-allocation of sufficient physical data-storage space within the mass-storage device to contain the three copy LUNs. By contrast, current mass-storage-device implementations do not provide automatic backups to rotating copy-LUN groups, largely as a result of the lengthy data-transfer times involved in currently available copy operations that may leave the copy LUN in an incomplete, READ-only state for lengthy periods of time.

Figure 14:
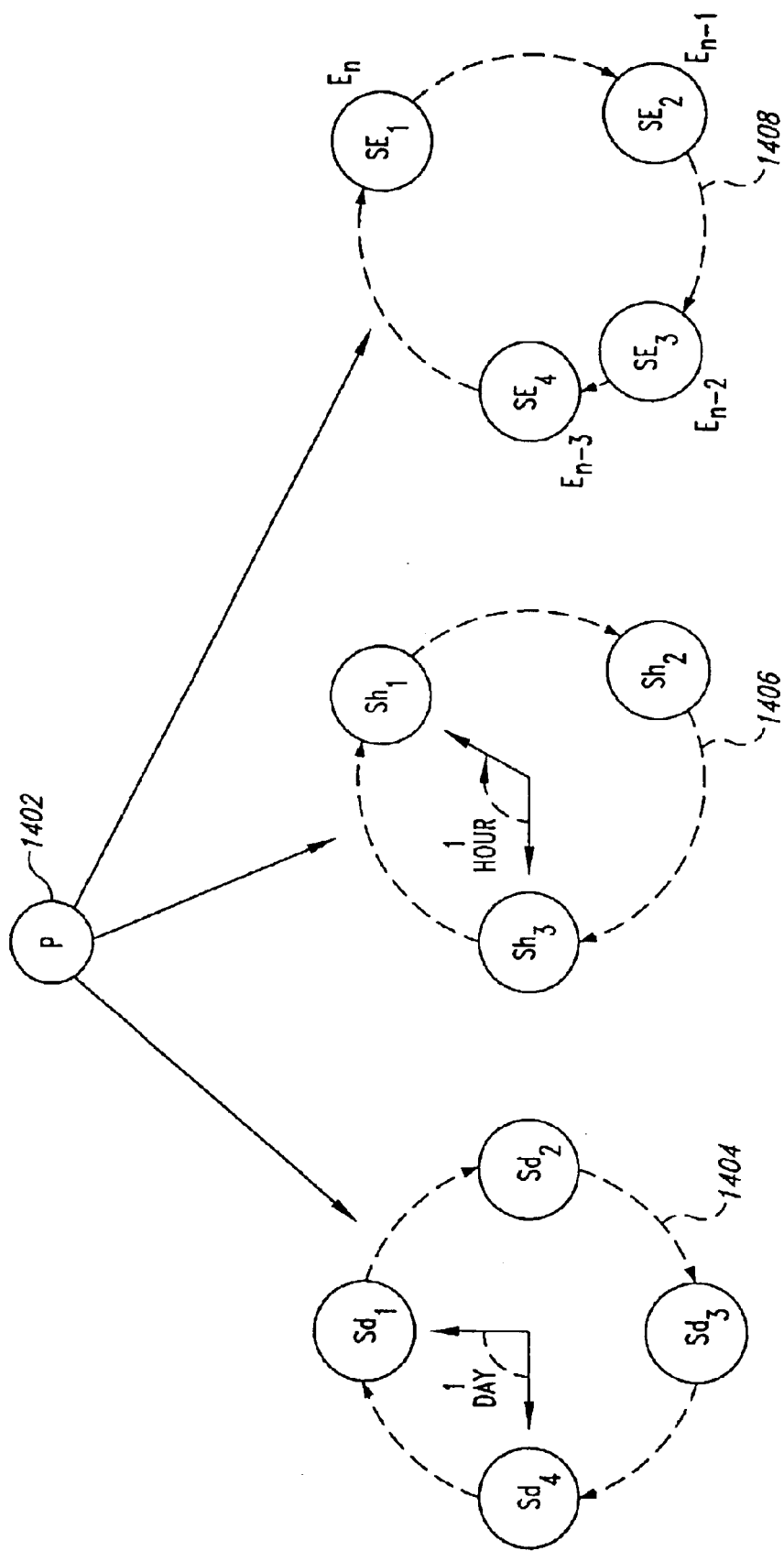
FIG. 14 illustrates one of an almost limitless number of different possible backup strategies made possible by copy-LUN groups.

Copy-LUN groups, in turn, allow for flexible primary-LUN backup strategies. FIG. 14 illustrates one of an almost limitless number of different possible backup strategies made possible by copy-LUN groups, discussed with reference to FIG. 13. In FIG. 14, a primary LUN 1402 is copied to a copy-LUN group 1404 at one-day intervals, providing a rather large-granularity automated backup. The primary LUN 1402 is also copied to a second copy-LUN group 1406 at one-hour intervals. Finally, the primary LUN 1402 is copied to a third copy-LUN group 1408 at irregular time internals, on the occurrence of any of certain events that trigger a primary-LUN copy operation to the third copy-LUN group. Again, employing the immediate-full-LUN-copy operations of the current invention, copy LUNS within copy-LUN groups may be immediately accessible for READ and WRITE operations following launch of the immediate-full-LUN-copy operation. Moreover, the copy-LUN groups can be pre-allocated to minimize resource contention within a mass-storage device. In addition, copy LUNs may be generated on remote mass-storage devices. Remote generation of copy LUNs is facilitated by the intermediate virtual-LUN state that provides READ and WRITE access to the copy LUN during a potentially lengthy complete data transfer from the primary-LUN to a remote copy LUN.

The following C++-like pseudo-code implementations illustrate augmentation of a simplified disk-array control program to provide an immediate-full-LUN-copy operation that represents the second of the two, above-described embodiments of the present invention. The C++-like pseudo-code implementations are by no means complete implementations, but serve only as illustrative examples.

First, a straightforward model of a simplified, currently existing disk-array controller is provided. The model includes a number of constant, type, and class declarations:

```
1   const int MAX_LUN = 4096;
2   const int BLKSIZE = 512;
3   enum error {OK, ERROR, NO_REF};
4   typedef int LUN_handle;
5   typedef struct p_add
6   {
7       int device;
8       int blk;
9   } physical_address;
10  class LUN
```

-continued

```
11 {
12    private:
13    public:
14        error WRITE_BLK(physical_address padd, char* buffer);
15        error READ_BLK(physical_address padd, char* buffer);
16        error GET_PHYSICAL(int address,
              physical_address & add);
17        void INITIALIZE( );
18 };
19 class controller
20 {
21    private:
22        LUN luns[MAX_LUN];
23        LUN* fetchLUN(LUN_handle handle);
24
25    public:
26        error CREATE_LUN (LUN_handle & handle,
              int* devices, int size);
27        error REMOVE_LUN (LUN_handle);
28        error WRITE_BLK(LUN_handle lun, int address,
29              int numBlks, char* buffer);
30        error READ_BLK(LUN_handle lun, int address,
31              int numBlks, char* buffer);
32 };
```

The constants MAX_LUN and BLKSIZE, declared above on lines 1–2, represent the number of LUNs allocatable by the disk-array controller and the size of a physical-data-storage unit, or block, respectively. The enumeration "error," declared above on line 3, represents error values returned by various function members, to be discussed below. The type definitions LUN_handle and physical_address, declared above on lines 5–9, represent a LUN identifier type and a physical-device-data-storage-unit type, respectively. The class "LUN," declared above on lines 10–18, represents a LUN within a mass-storage device. Private data and function members are not shown, as implementations vary considerably with different types of physical-data devices, mass-storage devices, and other aspects of the implementations. The class "LUN" includes public functions members for writing and reading a physical block, WRITE_BLK and READ_BLK, for translating a logical address to a physical address, GET_PHYSICAL, and for initializing the LUN, INITIALIZE. The class "controller" includes private data member "luns," declared on line 22, that stores instances of class "LUN" corresponding to allocated LUNs and a private function member, "fetchLUN," declared on line 23, that translates a LUN_handle into a pointer to an instance of the class "LUN," stored in data member "luns." The class "controller" includes the following public function members, declared on lines 26–31: (1) CREAT_LUN, which causes the controller to allocate a new LUN and return a handle to the new LUN in reference argument "handle;" (2) REMOVE_LUN, which causes the controller to deallocate a LUN; (3) WRITE_BLK, which directs a possibly multi-block WRITE operation to a LUN, starting at the logical address specified in argument "address," transferring data to the LUN from the buffer reference by argument "buffer;" and (4) READ_BLK, which directs a possibly multi-block READ operation to a LUN, starting at the logical address specified in argument "address," transferring data from the LUN to the buffer referenced by argument "buffer."

Next, implementations of the WRITE_BLK and READ_BLK function members of class "controller" are provided:

```
1 error controller::WRITE_BLK(LUN_handle lun, int address,
     int numBlks,
2                               char* buffer)
3 {
4    LUN* l = fetchLUN(lun);
5    int i;
6    physical_address padd;
7    if (l == NULL) return ERROR;
8    for (i = 0; i < numBlks; i++)
9    {
10       if (l->GET_PHYSICAL(address, padd) != OK)
            return ERROR;
11       else if (l->WRITE_BLK(padd, buffer) != OK)
            return ERROR;
12       buffer += BLKSIZE;
13       address++;
14    }
15    return OK;
16 }
```

WRITE_BLK translates the supplied LUN_handle "handle" into a LUN pointer, "1," on line 4. In the for-loop of lines 8–14, WRITE_BLK writes successive blocks from the buffer to the LUN, first translating logical addresses to physical-device addresses, where the logical addresses are block addresses.

```
1 error controller::READ_BLK(LUN_handle lun, int address,
     int numBlks,
2                              char* buffer)
3 {
4    LUN* l = fetchLUN(lun);
5    int i;
6    physical_address padd;
7    if (l == NULL) return ERROR;
8    for (i = 0; i < numBlks; i++)
9    {
10       if (l->GET_PHYSICAL(address, padd) != OK)
            return ERROR;
11       else if (l->READ_BLK(padd, buffer) != OK)
            return ERROR;
12       buffer += BLKSIZE;
13       address++;
14    }
15    return OK;
16 }
```

READ_BLK is quite similar to WRITE_BLK, with reads executed instead of writes in the for-loop of lines 8–14.

In the following, C++-like pseudocode, the above controller implementation is augmented to include an immediate-full-LUN-copy operation. First, the constant, type, and class definitions are again provided:

```
1  const int MAX_LUN = 4096;
2  const int BLKSIZE = 512;
3  enum error {OK, ERROR, NO_REF};
4  enum state {INIT, VIRTUAL, INDEPENDENT};
5  typedef int LUN_handle;
6  typedef struct p_add
7  {
8     int device;
9     int blk;
10 } physical_address;
1  class LUN
2  {
3     private:
4     public:
5        error WRITE_BLK(physical_address padd, char* buffer);
```

```
6      error READ_BLK(physical_address padd, char* buffer);
7      error GET_PHYSICAL(int address, physical_address &
           add);
8      void INITIALIZE( );
9      error write_ref(physical_address add1,
           physical_address add2);
10     error read_ref(physical_address add1,
           physical_address & add2);
11     int getNumBlks( );
12     bool isVirtual( );
13     void setVirtual( );
14     void clearVirtual( );
15     LUN_handle getPrimary( );
16     bool isPrimary( );
17     bool isPrimary(LUN_handle l);
18     void setPrimary(LUN_handle l);
19     void clearPrimary(LUN_handle l);
20     state getState( );
21 };
22 class controller
23 {
24     private:
25         LUN luns[MAX_LUN];
26         error asynchronousCopy(LUN* from, LUN* to);
27         LUN* fetchLUN(LUN_handle handle);
28     public:
29         error CREATE_LUN (LUN_handle & handle,
               int* devices, int size);
30         error REMOVE_LUN (LUN_handle);
31         error WRITE_BLK(LUN_handle lun, int address,
               int numBlks,
32                                   char* buffer);
33         error READ_BLK(LUN_handle lun, int address,
               int numBlks,
34                                   char* buffer);
35         error immediate_LUN_copy(LUN_handle from,
               LUN_handle to);
36 };
```

A new enumeration, "state," is declared on line 4, to represent the current state of a LUN. The class "LUN" includes the following new function members: (1) write_ref, which writes a redirection indication and reference, or pointer, to a copy LUN block to implement the references described, above, with reference to FIGS. 11B and 12A; (2) read_ref, which reads a reference from a copy LUN block; (3) getNumBlks, which returns the number of blocks in the LUN; (4) isVirtual, setVirtual, and clearVirtual, which query and toggle a flag indicating whether or not a LUN is a virtual LUN, or, in other words, in a transient virtual stage; (5) getprimary( ), isPrimary, setPrimary, and clearPrimary, which query and toggle a flag and list of virtual LUNs currently associated with a LUN; and (6) getState( ), which returns the state of a LUN. The class "controller" includes the following new function members: (1) asynchronousCopy, which launches a copy of a primary LUN to a copy LUN; and (2) immediate_LUN_copy, which represents the second, immediate-full-LUN-copy-and-split operation provides as second embodiment of the present invention, as discussed above.

Implementations of new and augmented controller function members "asynchronousCopy," READ_BLK, and "immediate_LUN_copy" are provided below:

```
1 error controller::asynchronousCopy(LUN* from, LUN* to)
2 {
3      int i;
4      physical_address P_padd, C_padd;
5      char buf[BLKSIZE];
6      error r;
7      for (i = 0; i <= from->getNumBlks( ); i++)
8      {
9          from->GET_PHYSICAL(i, P_padd);
10         to->GET_PHYSICAL(i, C_padd);
11         if (from->READ_BLK(P_padd, buf) != OK)
               return ERROR;
12         r = to->read_ref(C_padd, P_padd);
13         if (r == OK) r = to->WRITE_BLK(C_padd, buf);
14         if (r == ERROR) return ERROR;
15     }
16     return OK;
17 }
```

The function member "asynchronousCopy" launches an asynchronous process that transfers data from the primary-LUN "from" to the copy LUN "to," being careful to not overwrite any data written to the copy LUN via WRITE operations directed to the copy LUN.

```
1 error controller::READ_BLK(LUN_handle lun, int address,
       int numBlks,
2                                  char* buffer)
3 {
4      LUN* l = fetchLUN(lun);
5      LUN* p = NULL;
6      int i;
7      physical_address C_padd, P_padd;
8      error r1, r2;
9      if (l == NULL) return ERROR;
10     if (l->isVirtual( ))
11     {
12         p = fetchLUN(l->getPrimary( ));
13     }
14     for (i = 0; i < numBlks; i++)
15     {
16         if (l->GET_PHYSICAL(address, C_padd) != OK)
               return ERROR;
17         if (l->isVirtual( ))
18         {
19             r1 = l->read_ref(C_padd, P_padd);
20             if (r1 == OK) r2 = p->READ_BLK(P_padd, buffer);
21             else if (r1 == ERROR) return ERROR;
22         }
23         else r2 = l->READ_BLK(C_padd, buffer);
24         if (r2 != OK) return ERROR;
25         buffer += BLKSIZE;
26         address++;
27     }
28     return OK;
29 }
```

The function member READ_BLK is augmented to determine whether or not a LUN is virtual, and, if so, to redirect reads through pointers back to the primary LUN.

```
1 error controller::immediate_LUN_copy(LUN_handle from,
       LUN_handle to)
2 {
3      LUN* toLUN = fetchLUN(to);
4      LUN* fromLUN = fetchLUN(from);
5      error ret;
6      int i;
7      physical_address P_padd, C_padd;
8      if (!fromLUN->isPrimary(to) && toLUN->getState( ) ==
           INIT &&
9          fromLUN->getState( ) == INDEPENDENT &&
10         fromLUN->getNumBlks( ) <= toLUN->getNumBlks( ))
11     {
12         for (i = 0; i <= fromLUN->getNumBlks( ); i++)
```

-continued

```
13      {
14          fromLUN->GET_PHYSICAL(i, P_padd);
15          toLUN->GET_PHYSICAL(i, C_padd);
16          if (toLUN->write_ref(C_padd, P_padd) != OK)
                return ERROR;
17      }
18      toLUN->setVirtual( );
19      fromLUN->setPrimary(to);
20      WAIT(asynchronousCopy, fromLUN, toLUN, ret);
21      fromLUN->clearPrimary(to);
22      toLUN->clearVirtual( );
23      return ret;
24   }
25   else return ERROR;
26 }
```

The function member immediate_LUN_copy implements the immediate-full-LUN-copy-and-split operation that represents the second, above-described embodiment of the present invention. The supplied LUN_handles "from" and "to" are translated, on lines 3–4, into LUN pointers "toLUN" and "fromLUN." In the for-loop of lines 8–24, the copy LUN is first initialized with pointers, on lines 12–17, and then the copy operation is launched asynchronously on line 20. Following the completion of the copy, the primary and copy LUNs are set to independent LUNs, on lines 21 and 22.

Although the present invention has been described in terms of at least two embodiments, it is not intended that the invention be limited to these embodiments. Modifications within the spirit of the invention will be apparent to those skilled in the art. For example, the immediate-full-LUN-copy operations of the present invention may be implemented in an almost limitless number of ways, in software, firmware, logic circuits, or a combination of two or more of software, firmware, and logic circuits. The immediate-full-LUN-copy operations can be implemented in disk arrays as well as in many other types of multiple-LUN mass storage devices. Many possible variations of the immediate-full-LUN-copy operations are possible, with different semantics and timings of events.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for copying a logical-data-storage entity within a mass storage device, the method comprising:
    providing a primary logical-data-storage entity having data-storage units;
    pre-allocating a copy logical-data-storage entity having data-storage units;
    initializing the copy logical-data-storage entity to contain, in each data-storage unit, an indirection indication to a corresponding data-storage unit within the primary logical-data-storage entity; and
    copying data from the primary logical-data-storage entity to the copy logical-data-storage entity, overwriting the indirection indications while, at the same time, allowing READ and WRITE access to the primary logical-data-storage entity and READ access to the copy logical-data-storage entity.

2. The method of claim 1 further including, during the copy operation, allowing READ and WRITE access to both the primary logical-data-storage entity and the copy logical-data-storage entity.

3. The method of claim 1 further including allowing READ and WRITE access to both the primary logical-data-storage entity and the copy logical-data-storage entity only after the primary-logical-data-storage-entity/copy-logical-data-storage-entity is split.

4. A mass-storage-device controller that implements the method of claim 1.

5. A mass-storage device including a controller that implements the method of claim 1.

6. Computer-readable instructions that implement the method of claim 1 stored on a computer-readable medium.

7. A virtual logical-data-storage entity within a mass storage device comprising:
    a primary logical-data-storage entity containing a number of data-storage units; and
    a copy logical-data-storage entity containing a number of data-storage units equal to, or greater than, the number of data-storage units in the primary logical-data-storage entity, each of which initially contain an indirection indication to a corresponding data-storage unit in the primary logical-data-storage entity.

8. The virtual logical-data-storage entity of claim 7 wherein READ and WRITE operations may be directed to the primary logical-data-storage entity and READ operations may directed to the copy logical-data-storage entity while the copy logical-data-storage entity.

9. The virtual logical-data-storage entity of claim 7 wherein READ and WRITE operations may be directed to the primary logical-data-storage entity and to the copy logical-data-storage entity while the copy logical-data-storage entity.

10. The virtual logical-data-storage entity of claim 7 wherein, over time, data contained in the data-storage units of the primary logical-data-storage entity is copied to corresponding data-storage units of the copy logical-data-storage entity, overwriting the indirection indications initially stored in the data-storage units copy logical-data-storage entity.

11. The virtual logical-data-storage entity of claim 10 wherein data contained in the data-storage units of the primary logical-data-storage entity is copied only to corresponding data-storage units of the copy logical-data-storage entity that contain indirection indications.

12. A method for copying a storage entity within a mass storage device, the method comprising:
    providing a primary storage entity having data-storage units;
    pre-allocating a copy storage entity having data-storage units;
    initializing the copy storage entity to store, associated with each data-storage unit, an indirection indication to a corresponding data-storage unit within the primary storage entity;
    when a READ access directed to the copy storage entity is received and a data storage unit to which the READ access is directed references an indirection indication, reading a corresponding data storage unit on the primary storage entity; and when a READ access directed to the copy storage entity is received and a data storage unit to which the READ access is directed does not reference an indirection indication, reading the data storage unit on the copy storage entity.

13. The method for copying a storage entity within a mass storage device of claim 12, the method further comprising:

when a WRITE access directed to the copy storage entity is received, writing data contained in the WRITE access to a storage entity to which the WRITE request was directed and updating a bit map to indicate that the storage entity has been overwritten.

14. A method for copying a storage entity within a mass storage device, the method comprising:

providing a primary storage entity having data-storage units;

pre-allocating a copy storage entity having data-storage units;

initializing the copy storage entity to store, associated with each data-storage unit, an indirection indication to a corresponding data-storage unit within the primary storage entity; and satisfying a READ access directed to the copy storage entity from the primary storage entity if the data-storage unit to which the READ access is directed is associated with an indirection indication to the primary storage entity.

15. The method of claim 14 further including:

satisfying a READ access directed to copy storage entity from the copy storage entity if the data-storage unit to which the READ access is directed is not associated with an indirection indication to the primary storage entity.

* * * * *

UNITED STATES PATENT AND TRADEMARK OFFICE
CERTIFICATE OF CORRECTION

PATENT NO. : 6,907,505 B2  
APPLICATION NO. : 10/209822  
DATED : June 14, 2005  
INVENTOR(S) : Robert A. Cochran et al.

It is certified that error appears in the above-identified patent and that said Letters Patent is hereby corrected as shown below:

In column 1, line 27, delete "modem" and insert -- modern --, therefor.

In column 1, line 48, delete "modem" and insert -- modern --, therefor.

In column 10, line 67, delete "Cram" and insert -- from --, therefor.

Signed and Sealed this

Twentieth Day of July, 2010

David J. Kappos  
*Director of the United States Patent and Trademark Office*